United States Patent [19]
Lennen

[11] Patent Number: 5,805,108
[45] Date of Patent: Sep. 8, 1998

[54] APPARATUS AND METHOD FOR PROCESSING MULTIPLE FREQUENCIES IN SATELLITE NAVIGATION SYSTEMS

[75] Inventor: Gary R. Lennen, Cupertino, Calif.

[73] Assignee: Trimble Navigation Limited, Sunnyvale, Calif.

[21] Appl. No.: 714,188

[22] Filed: Sep. 16, 1996

[51] Int. Cl.⁶ ........................................ G01S 5/02
[52] U.S. Cl. .......................... 342/357; 364/449.7
[58] Field of Search .................... 342/352, 357; 364/449.7, 449.1; 375/200

[56] References Cited

U.S. PATENT DOCUMENTS

| | | | |
|---|---|---|---|
| 4,972,431 | 11/1990 | Keegan | 375/1 |
| 5,072,227 | 12/1991 | Hatch | 342/357 |
| 5,155,490 | 10/1992 | Spradley et al. | 342/357 |
| 5,576,715 | 11/1996 | Litton et al. | 342/357 |

*Primary Examiner*—Thomas H. Tarcza
*Assistant Examiner*—Dao L. Phan
*Attorney, Agent, or Firm*—Boris G. Tankhilevich

[57] ABSTRACT

The multiple frequency satellite correlation receiver is disclosed. The three frequency receiver allows one to significantly enhance the widelane carrier phase measurements in order to improve the differential and survey navigation applications.

13 Claims, 24 Drawing Sheets

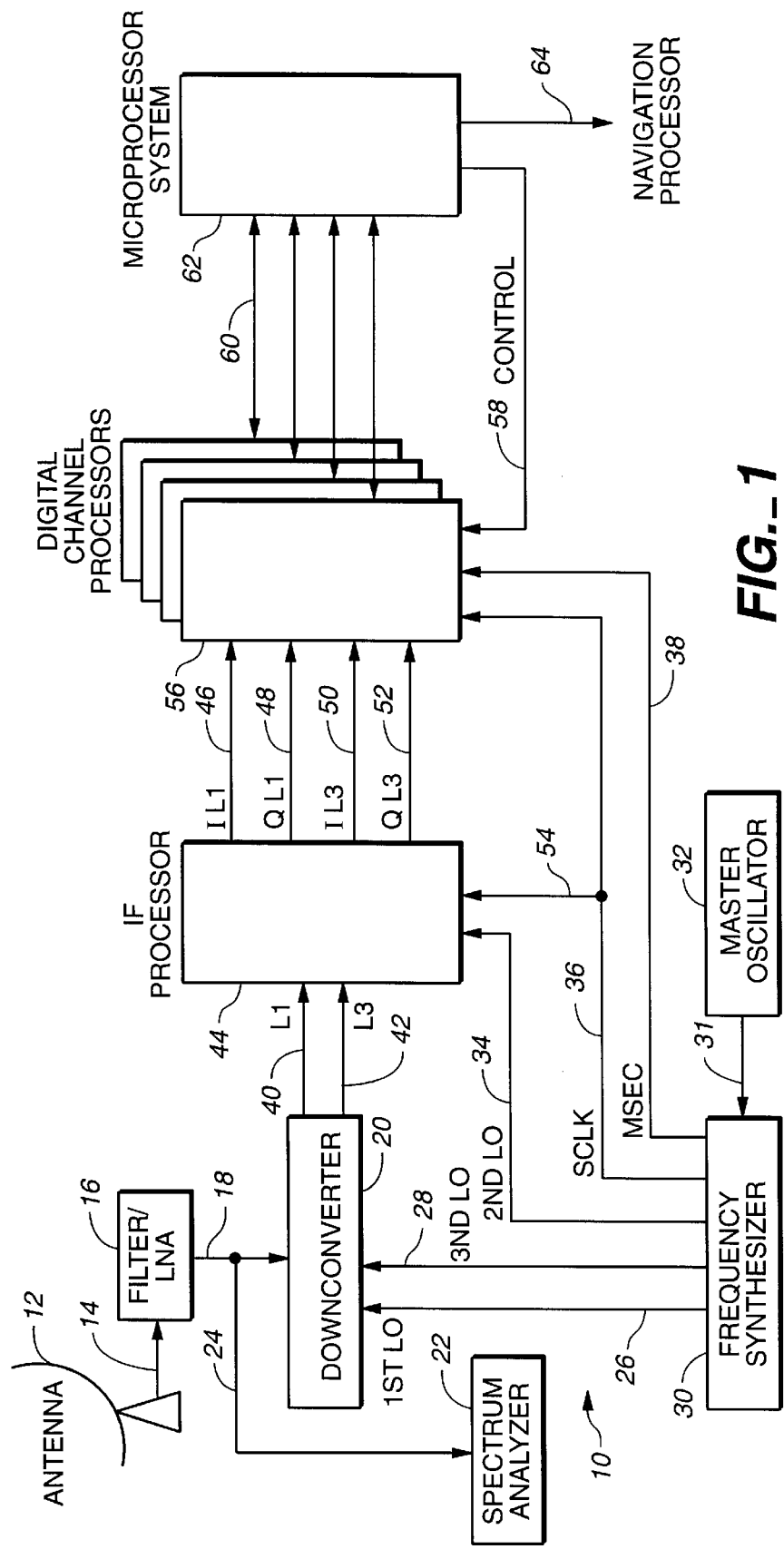
FIG._1

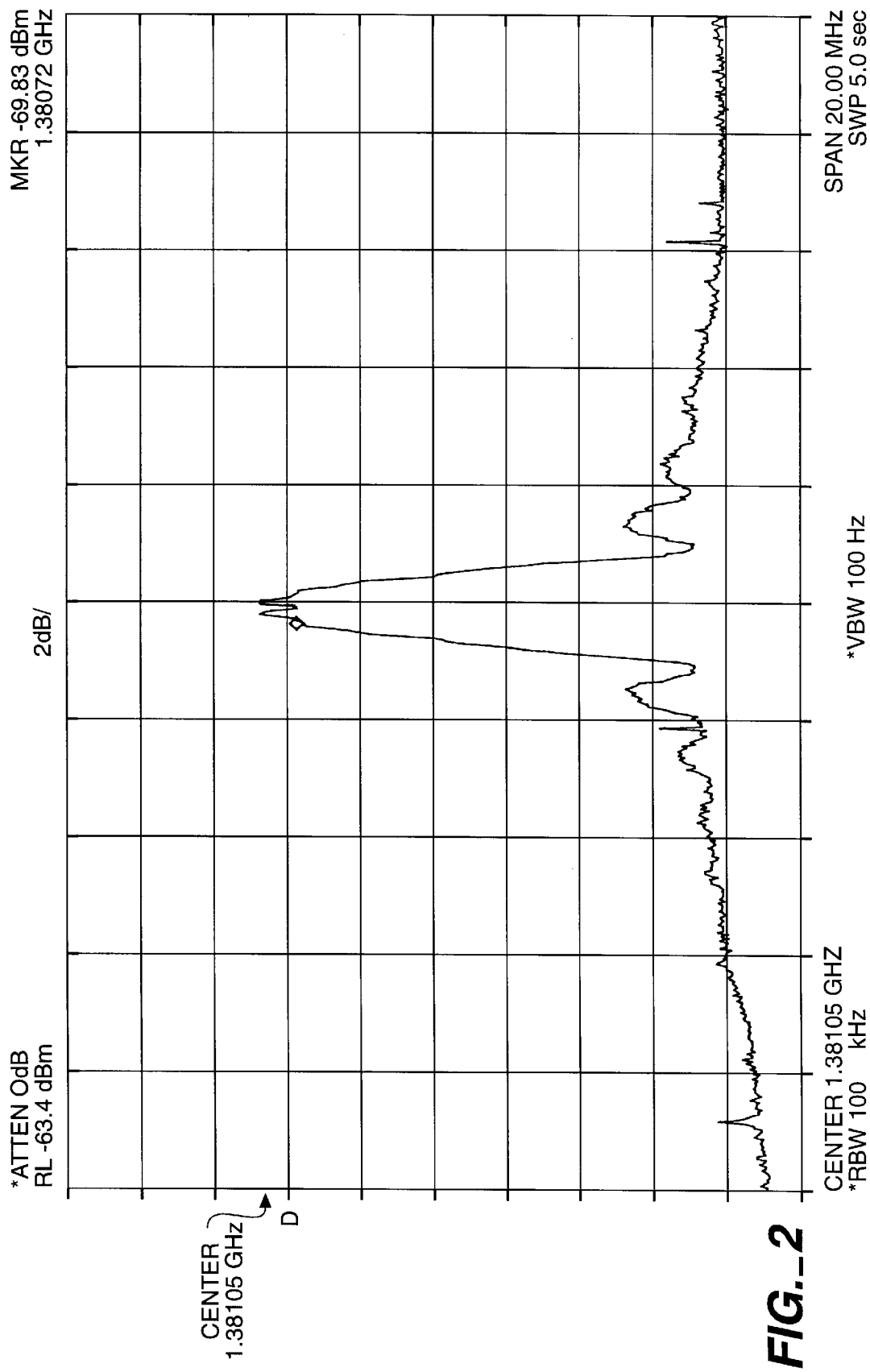
FIG._2

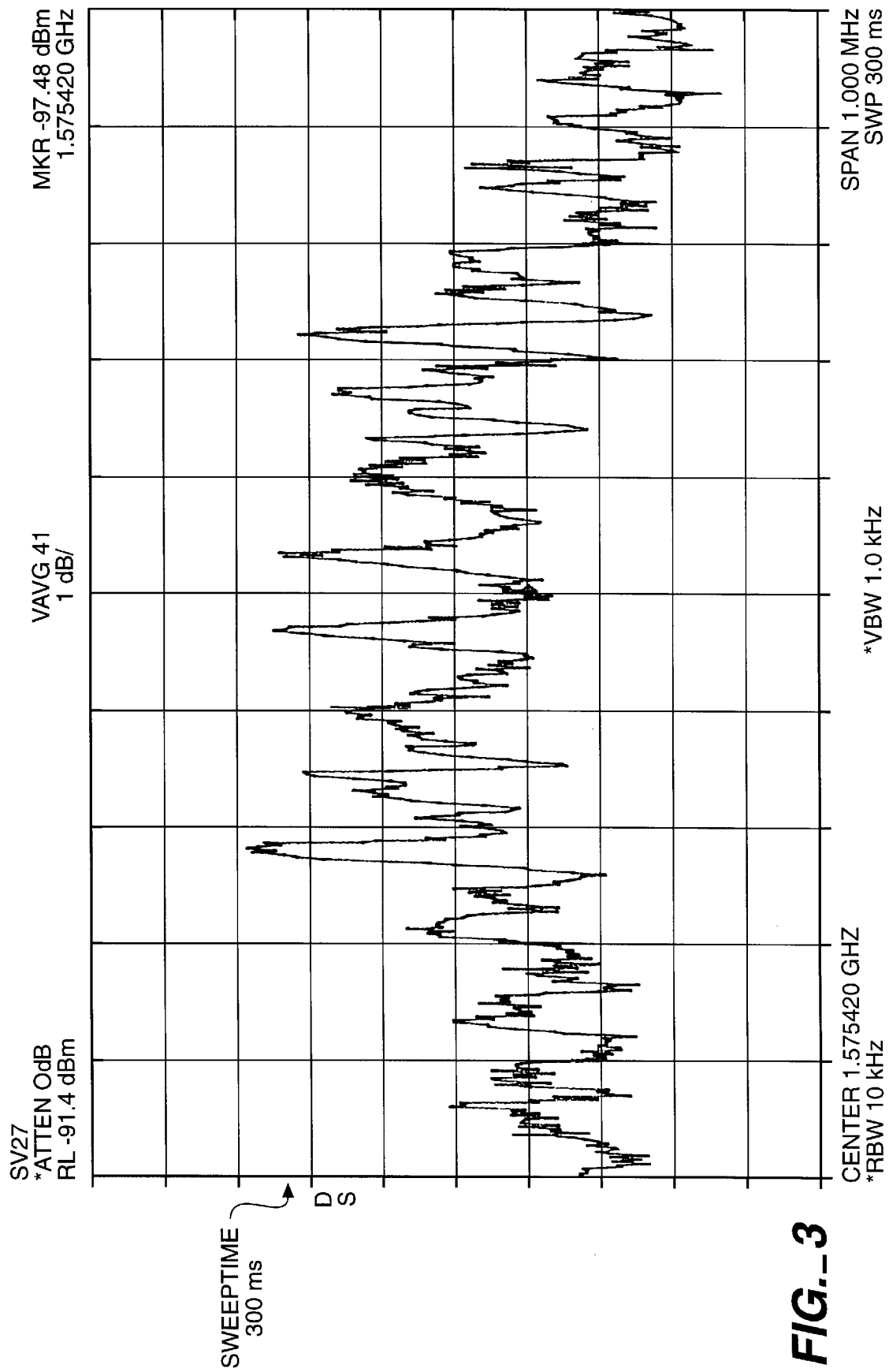
FIG._3

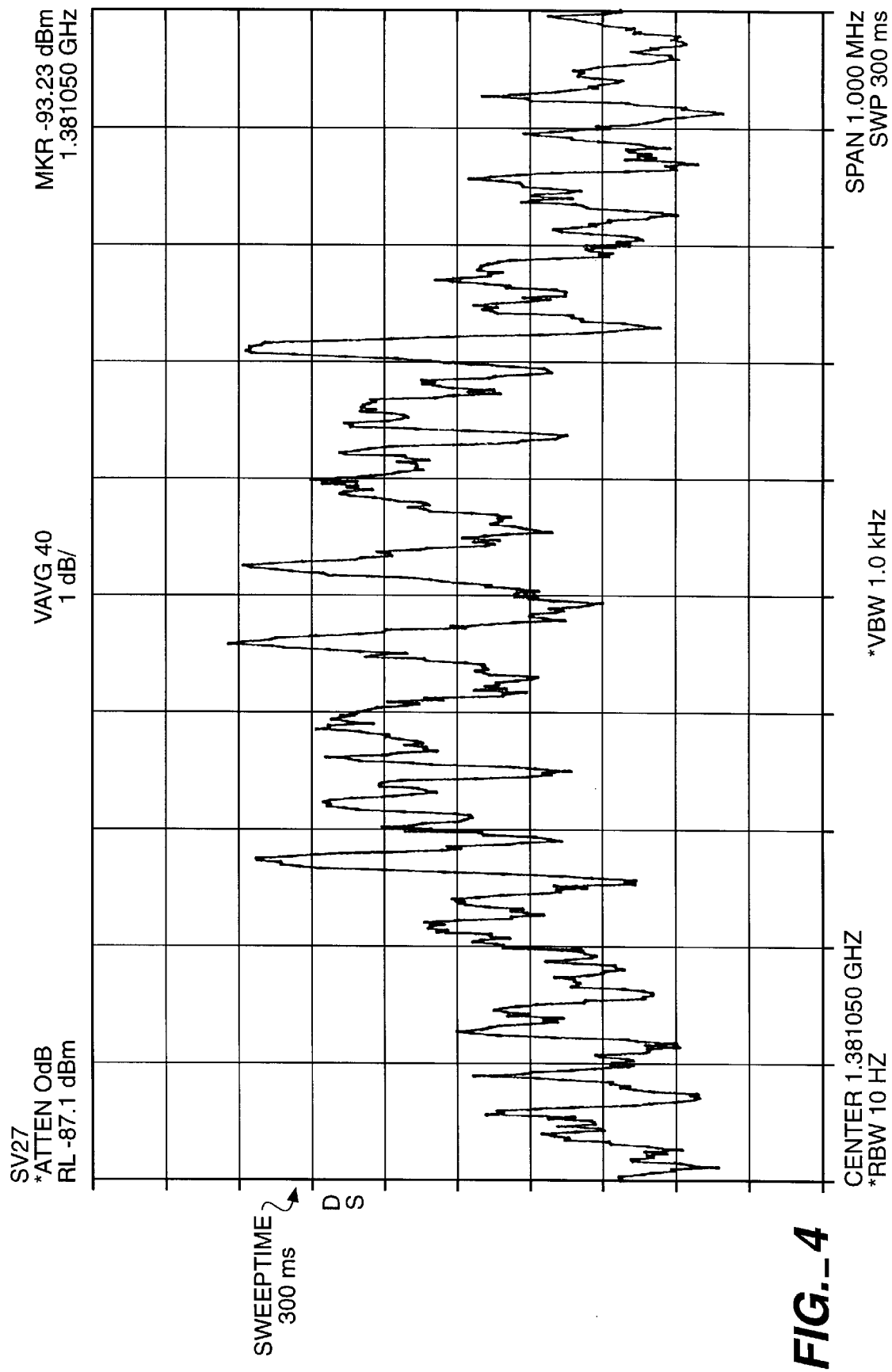
FIG._4

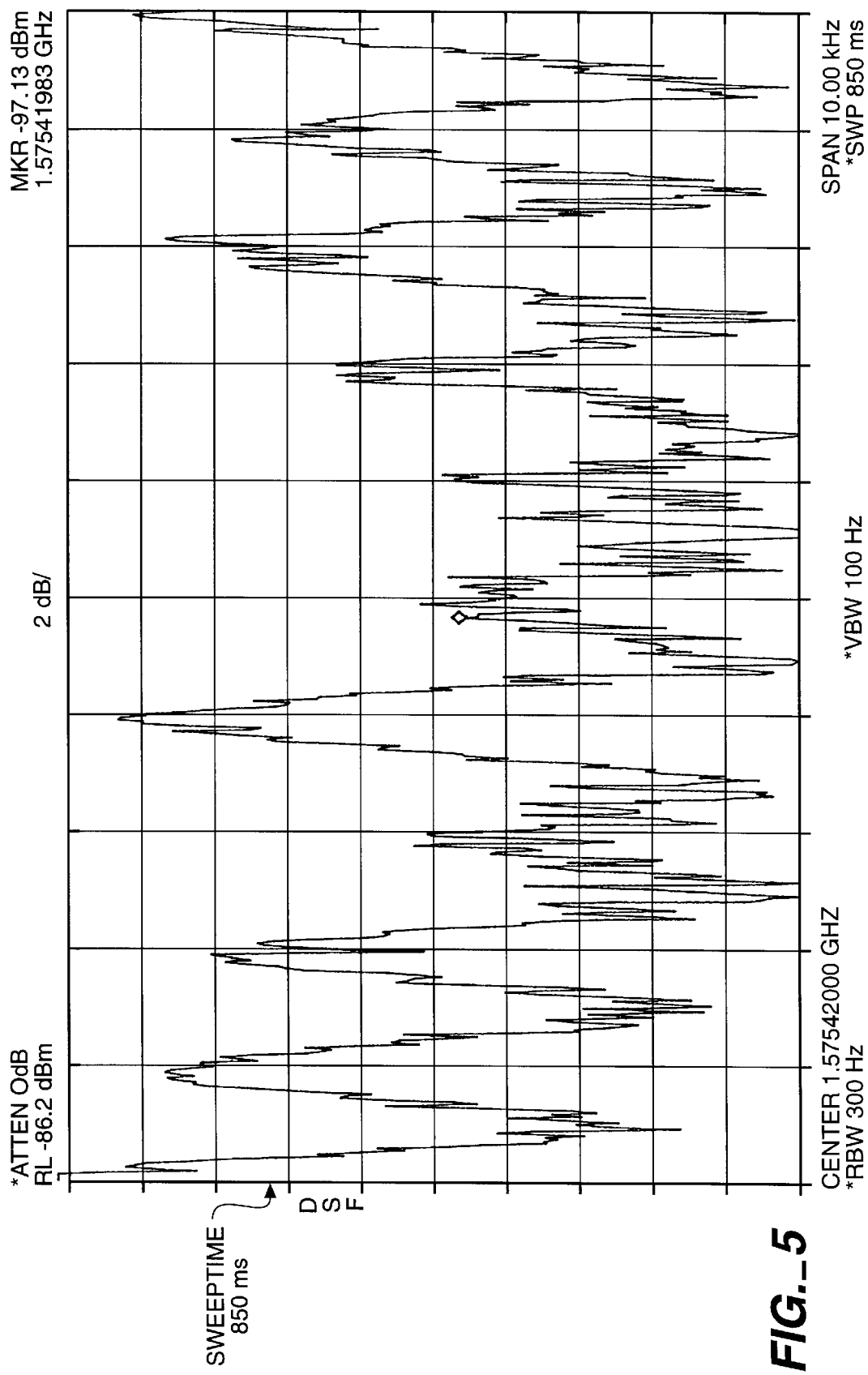
FIG._5

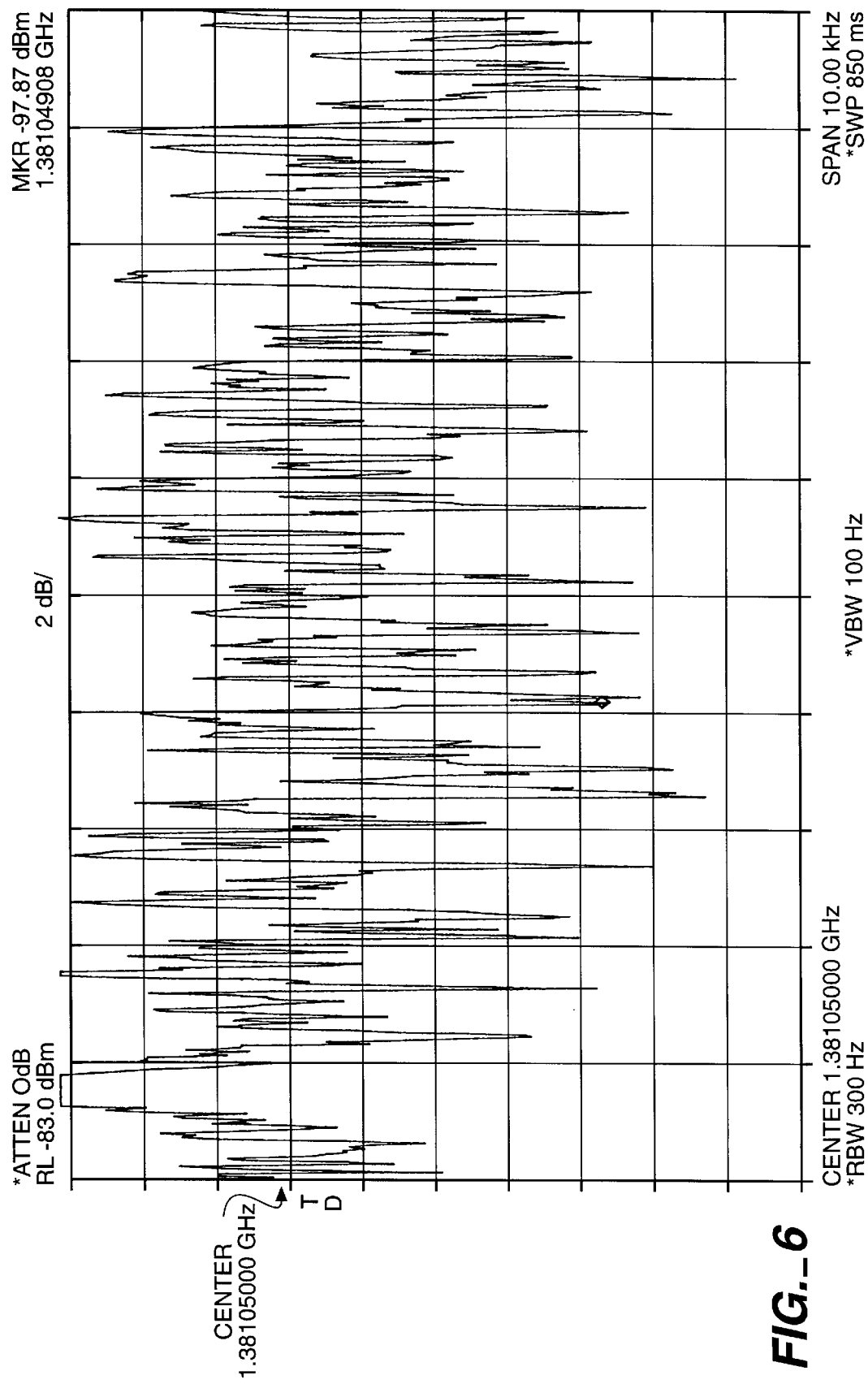
FIG._6

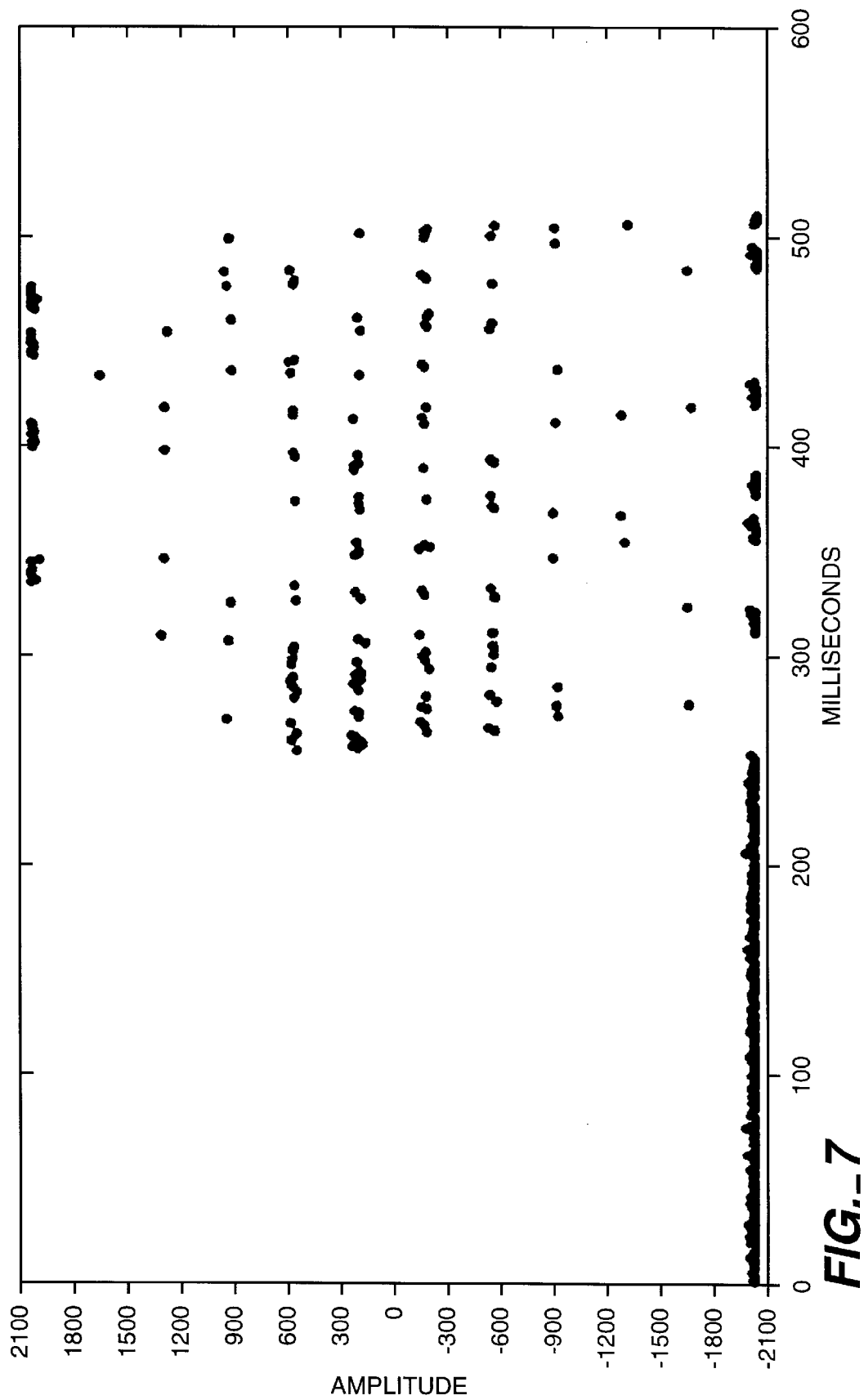
FIG._7

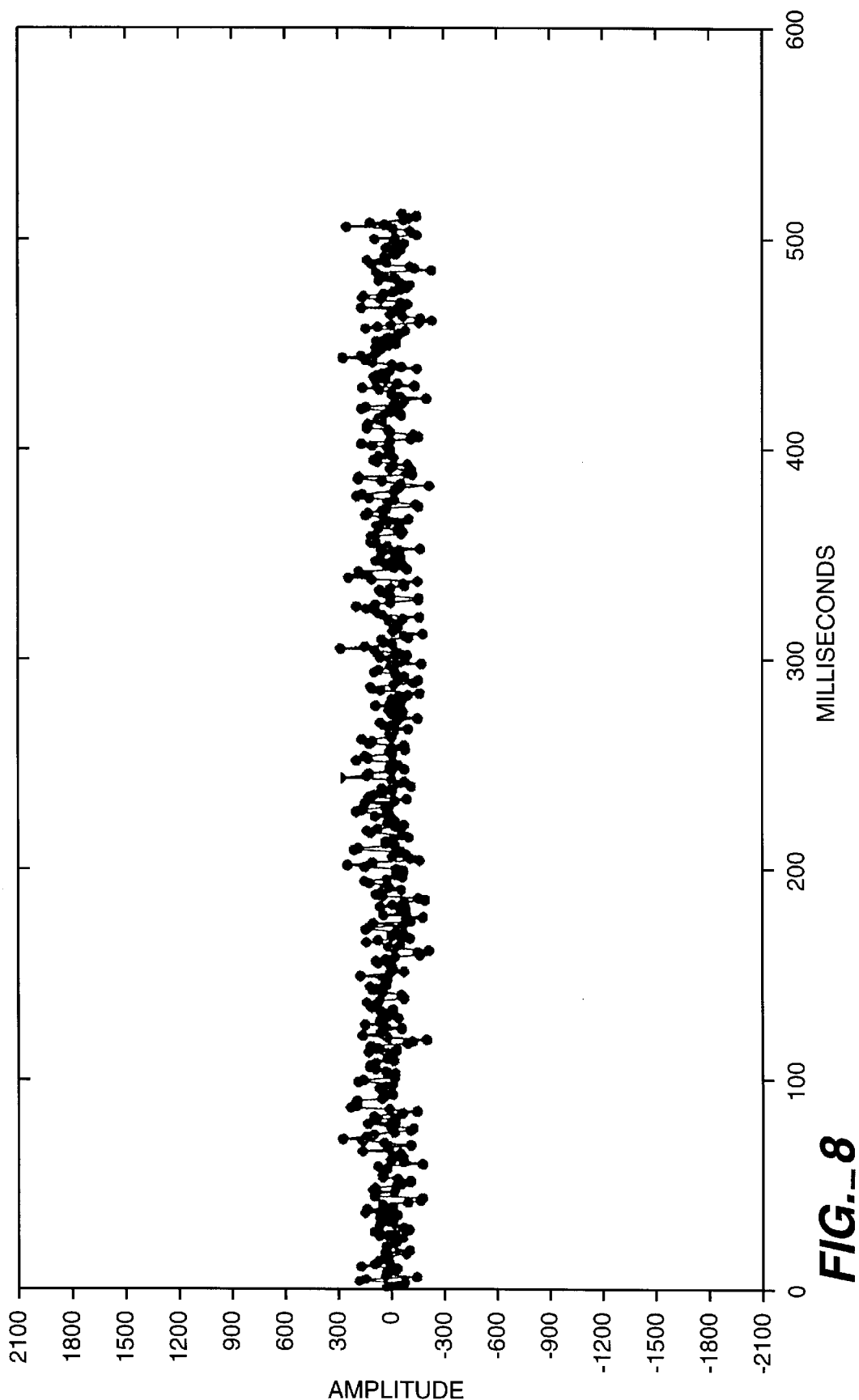
FIG._8

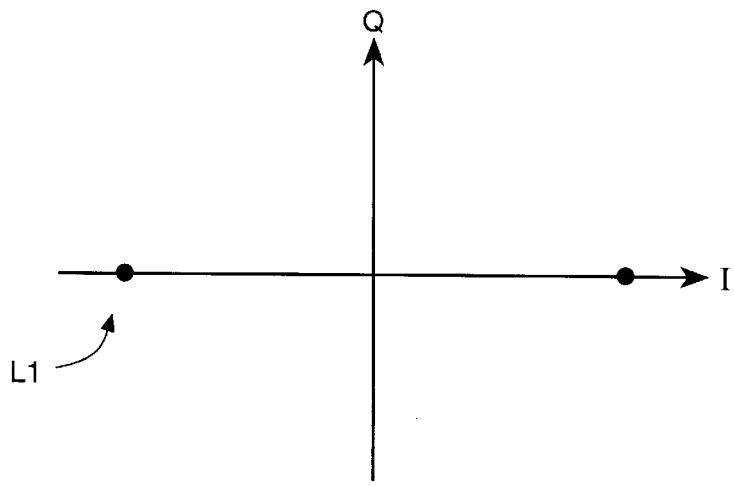
FIG._9A
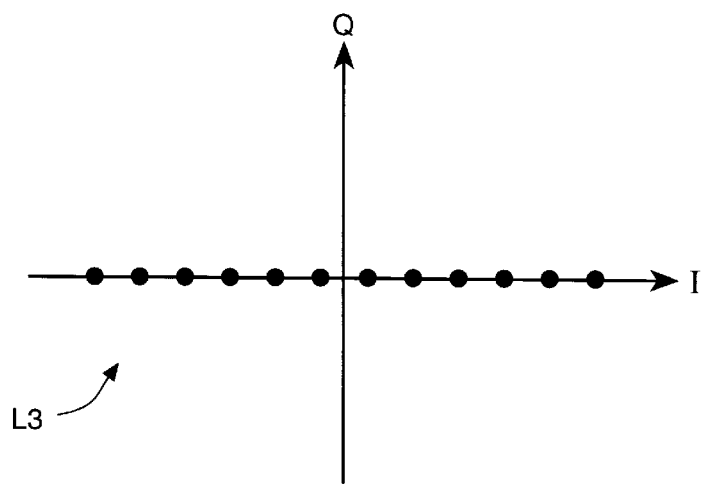
FIG._9B
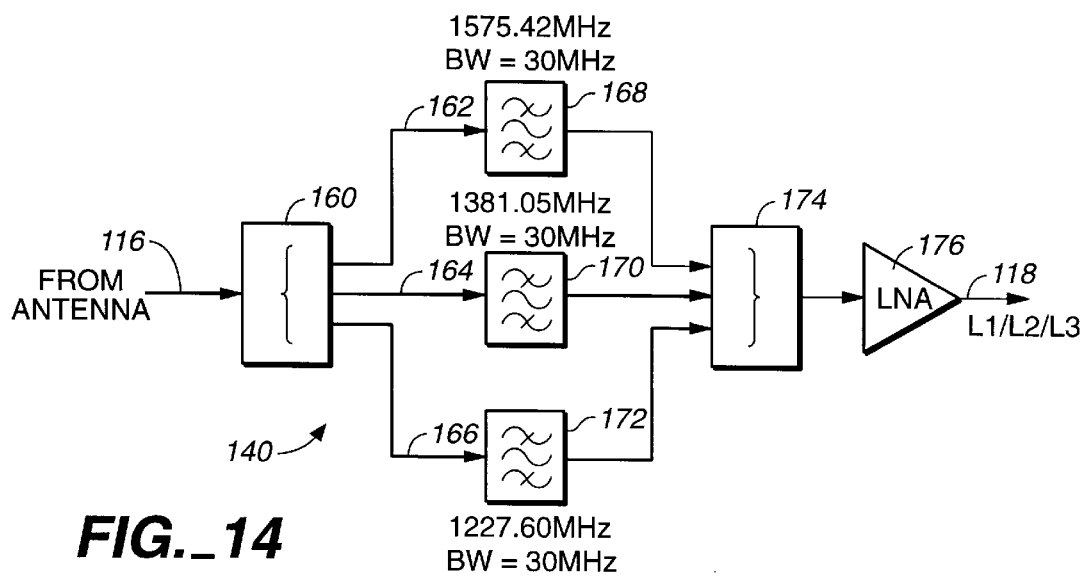
FIG._14

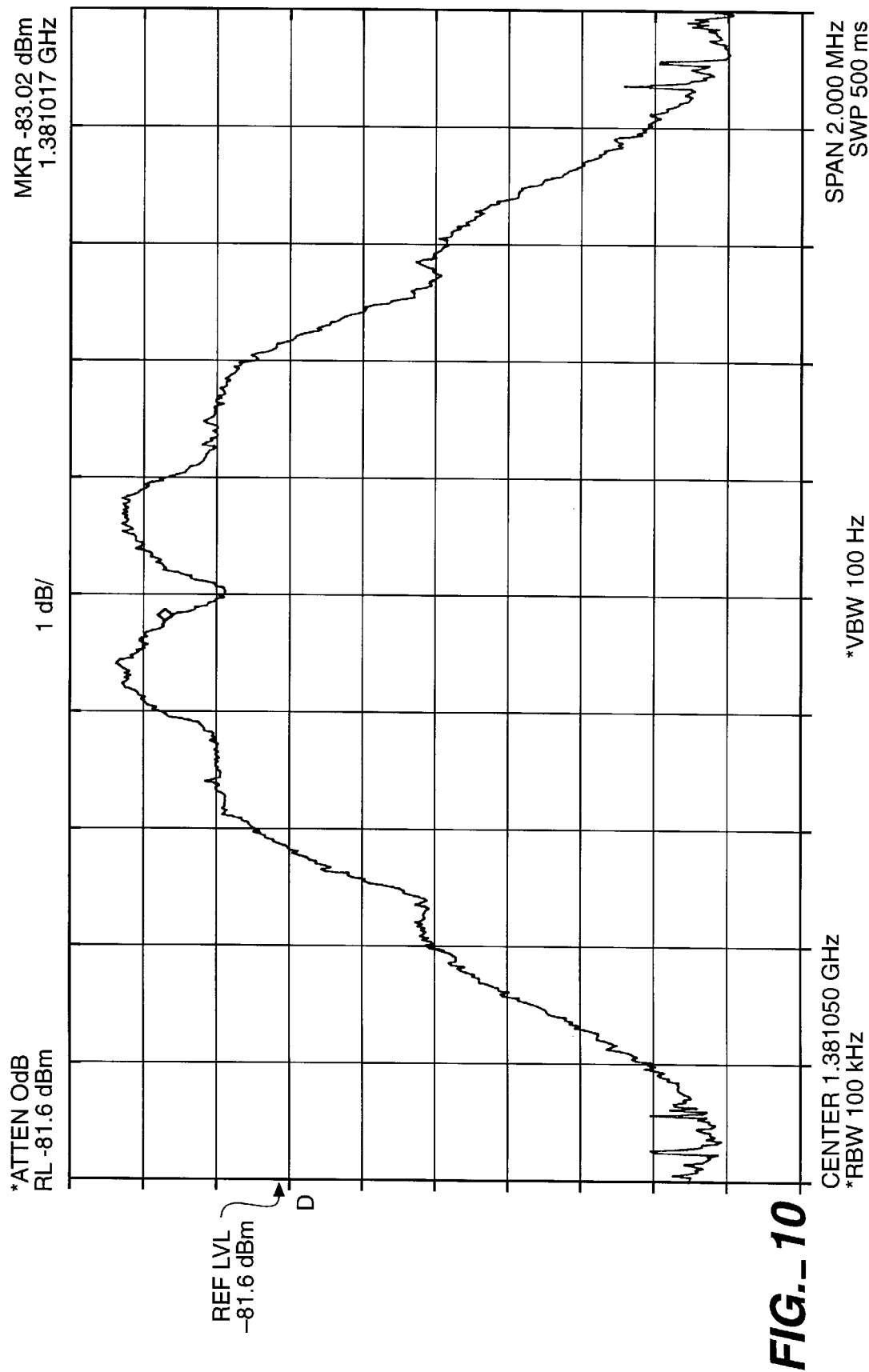
FIG._10

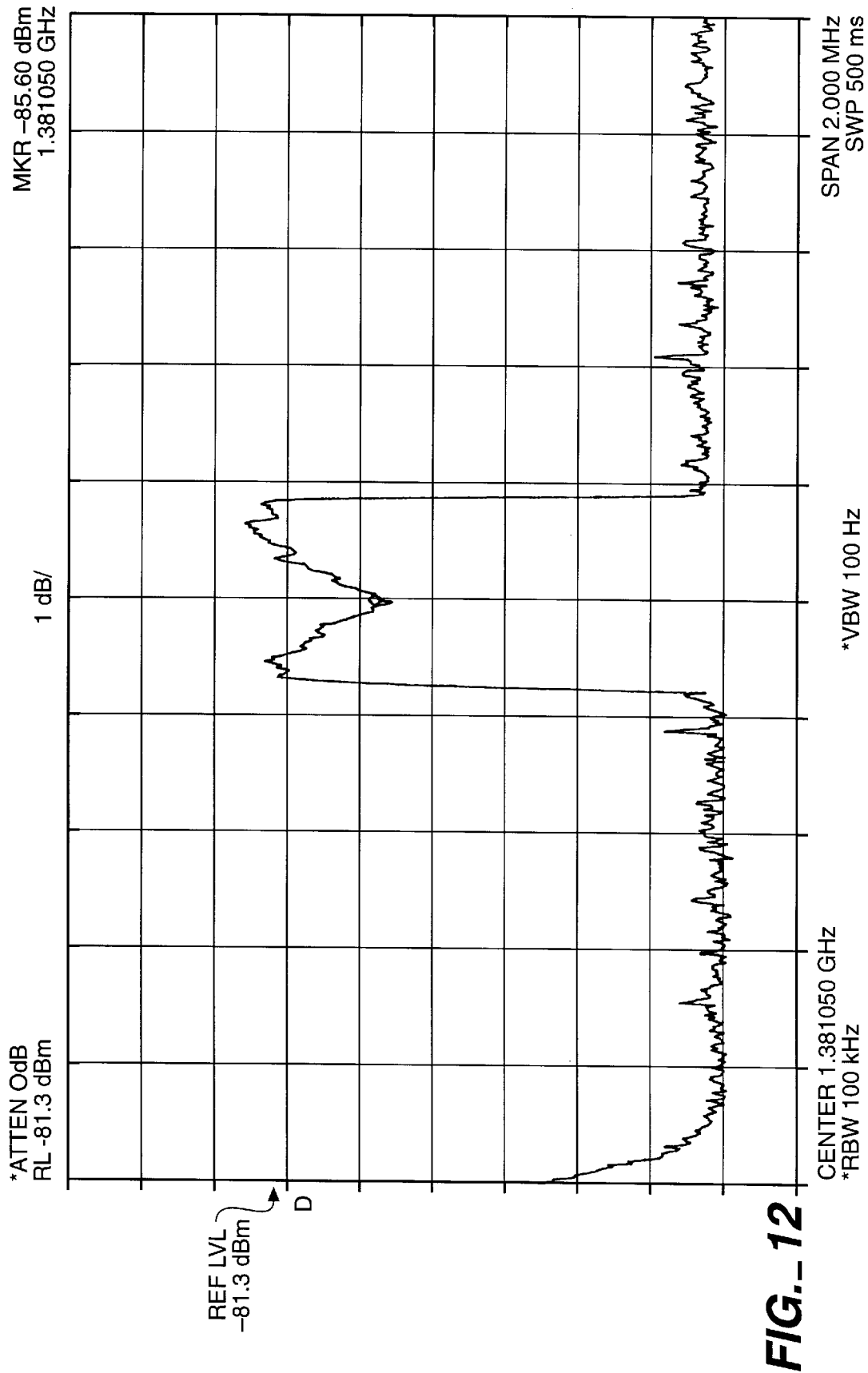
FIG._12

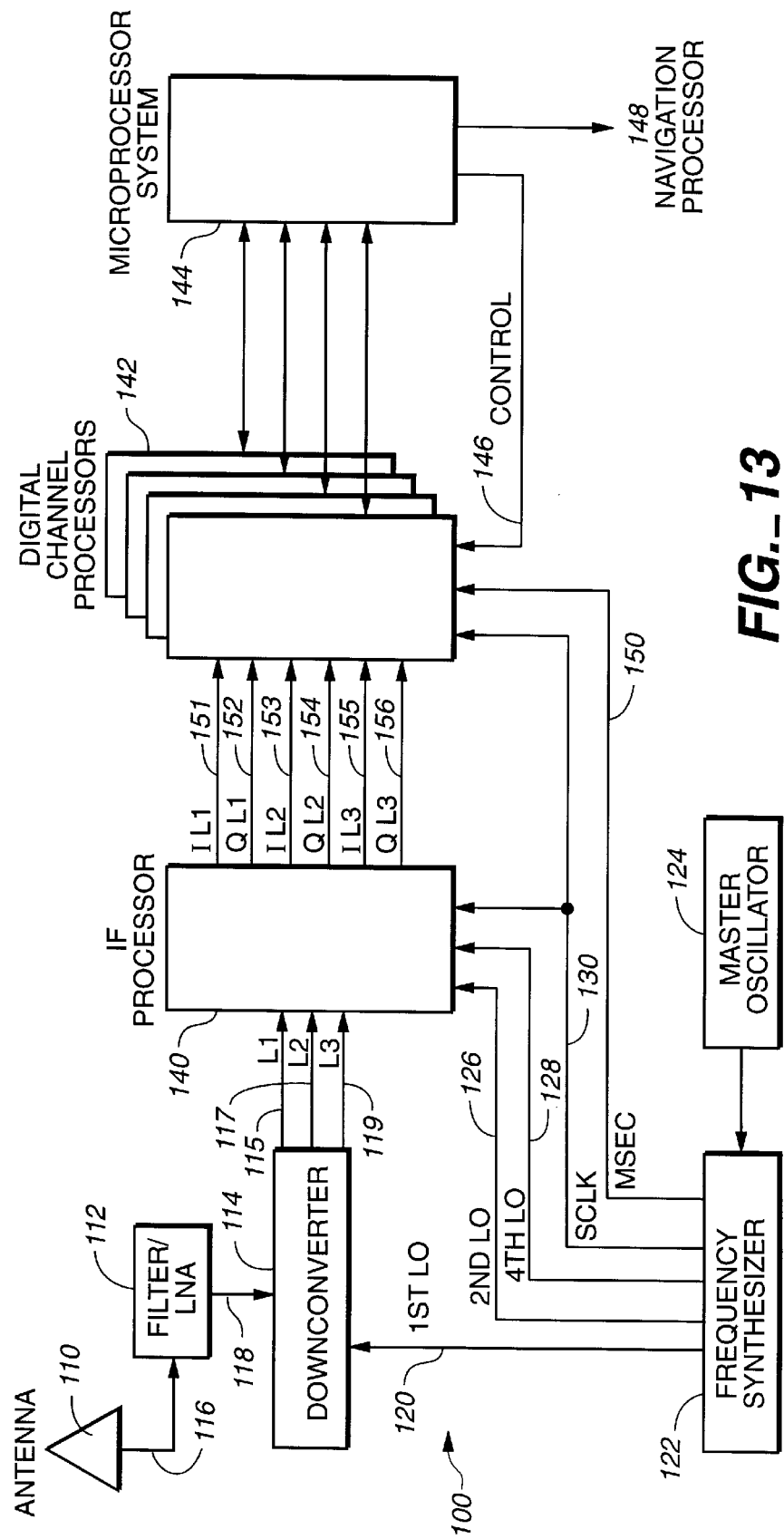
FIG._13

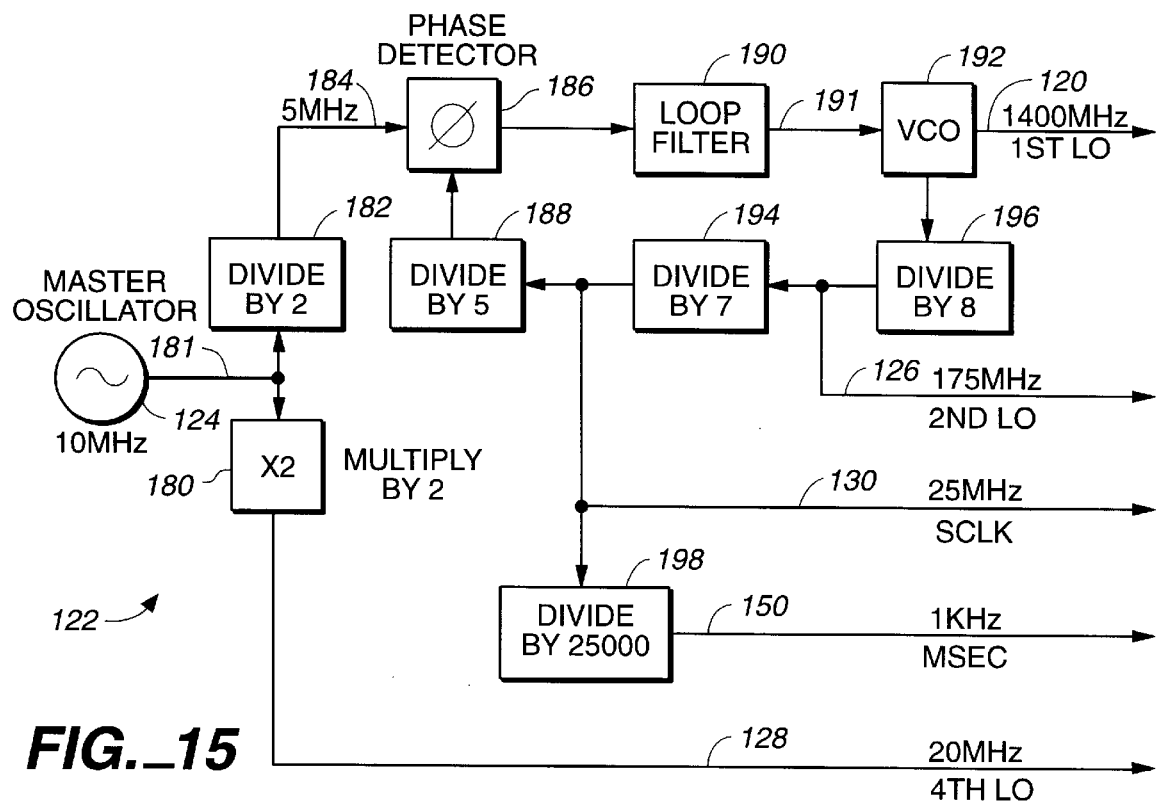
FIG._15
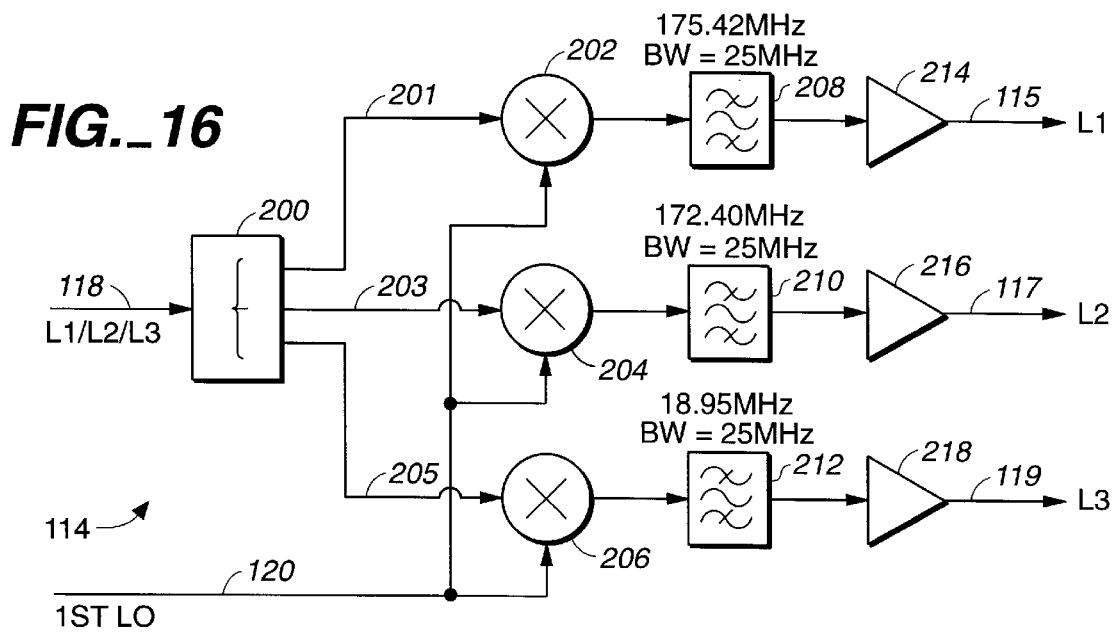
FIG._16

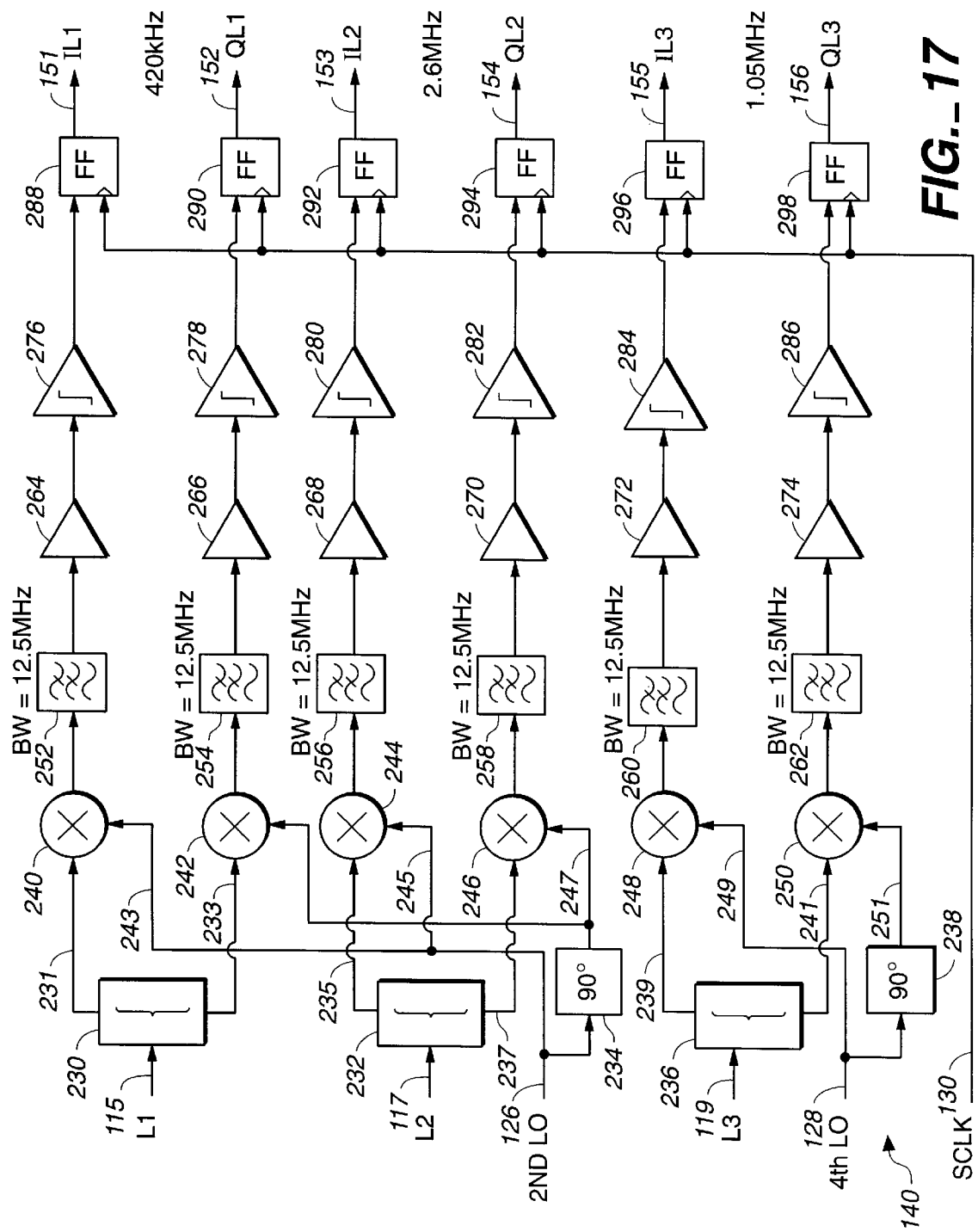
FIG._17

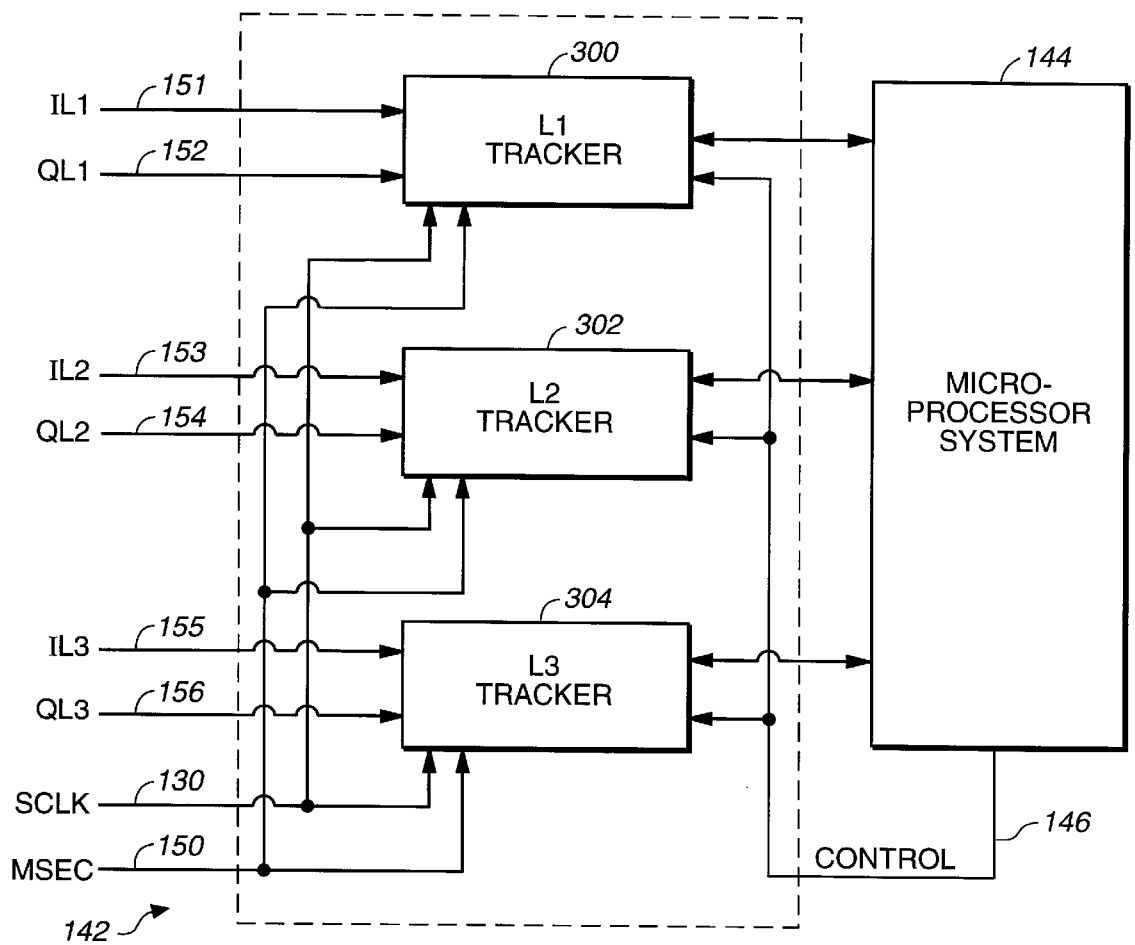
FIG._18

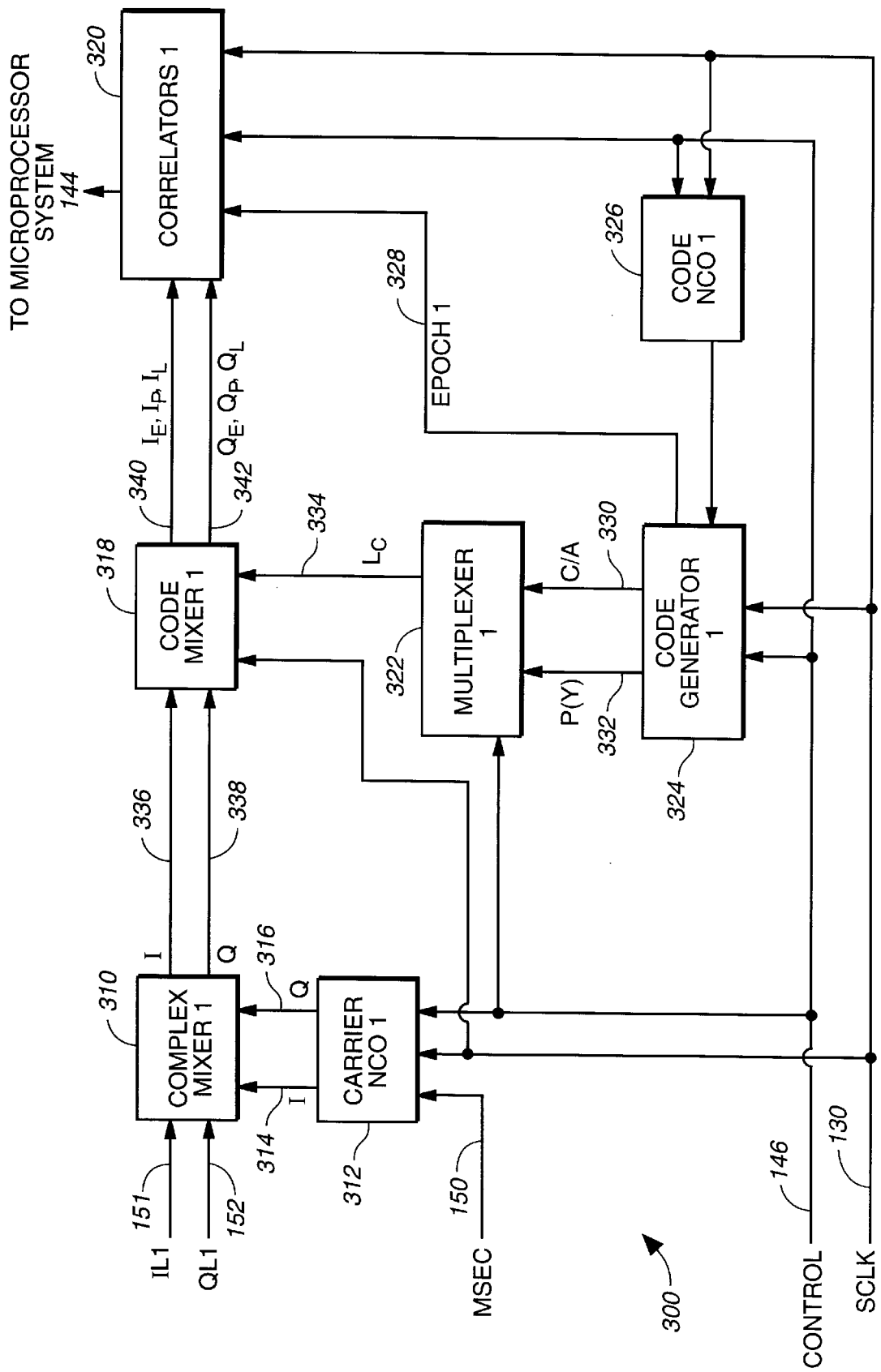
FIG._19

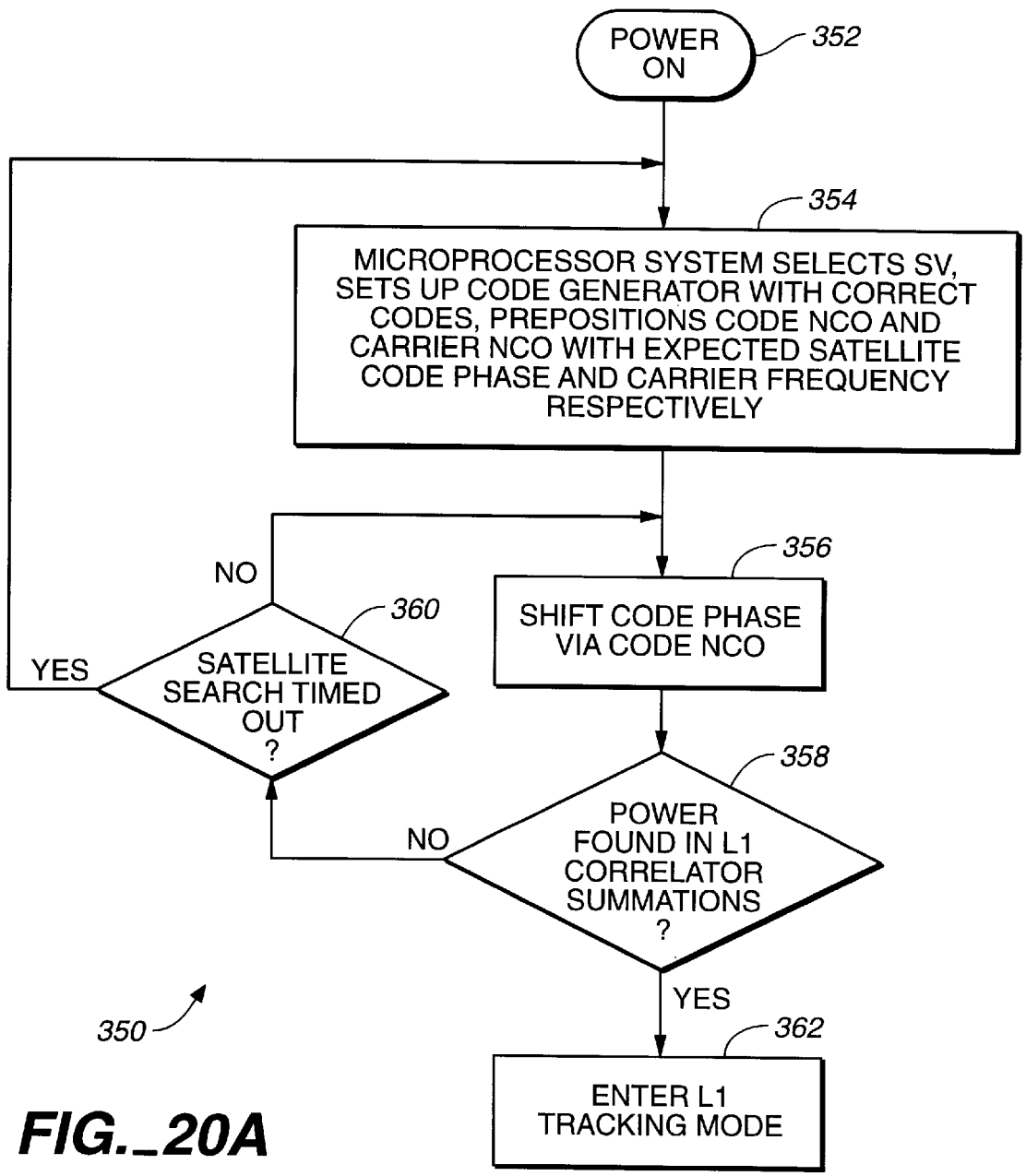
FIG._20A

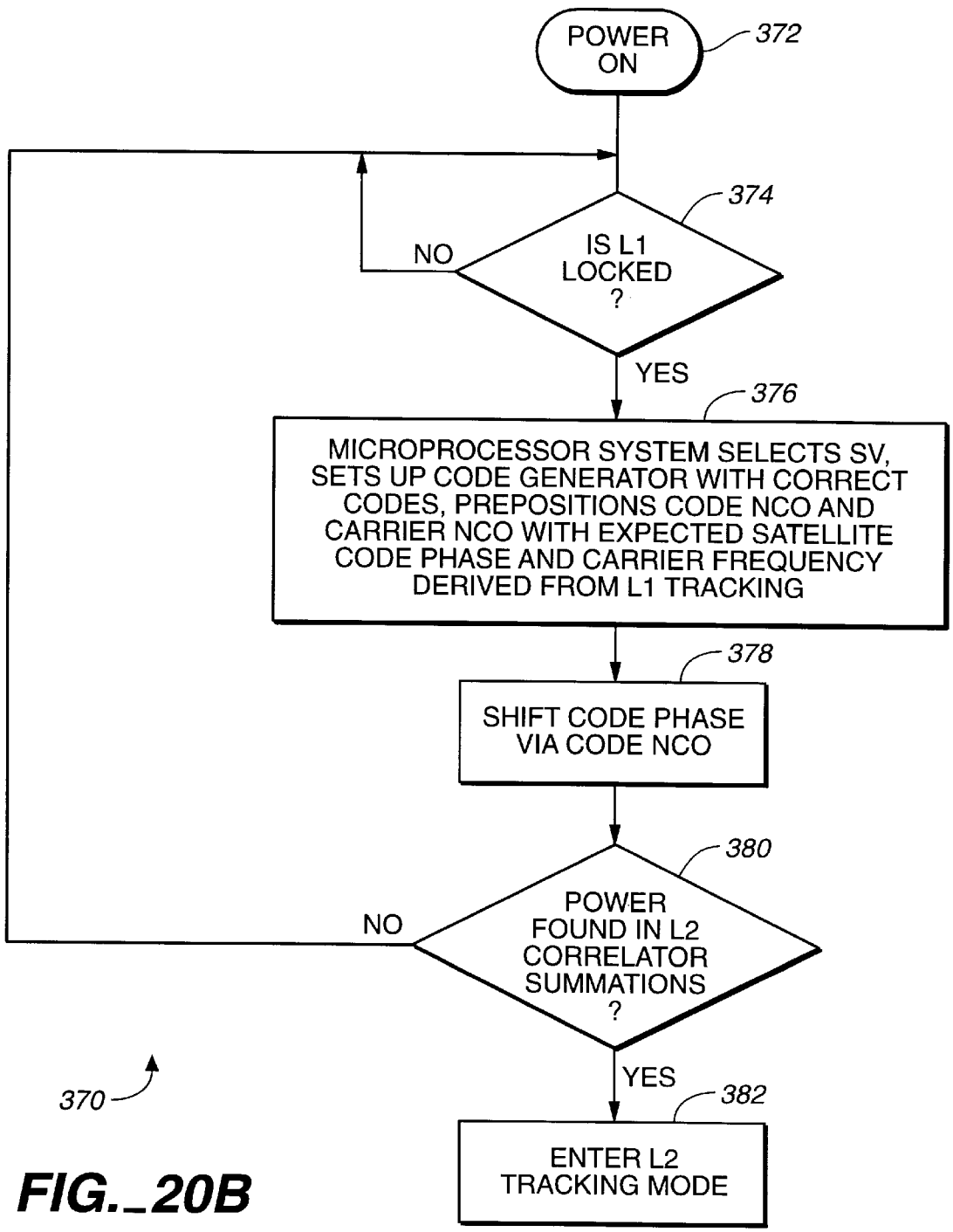
FIG._20B

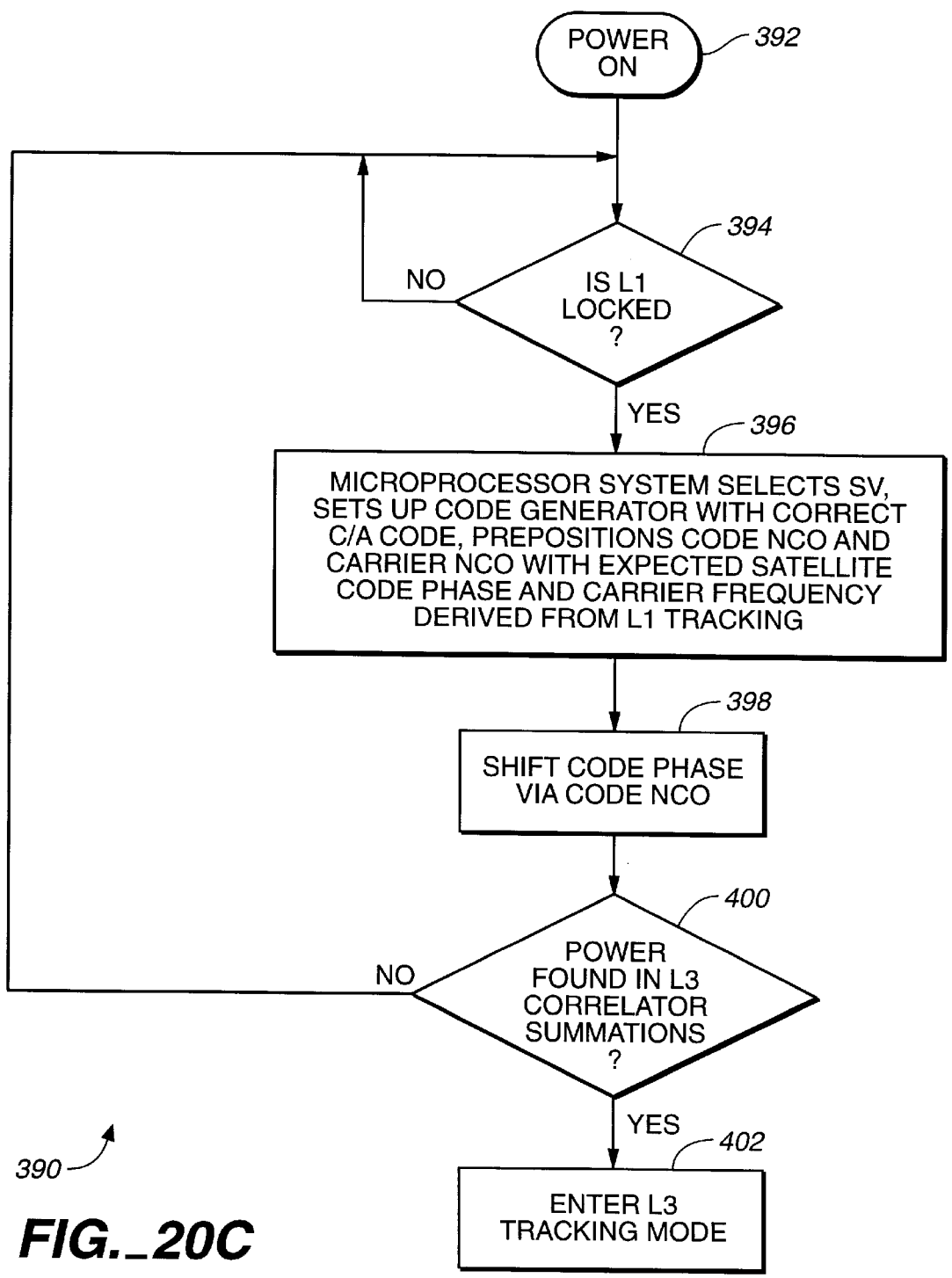
FIG._20C

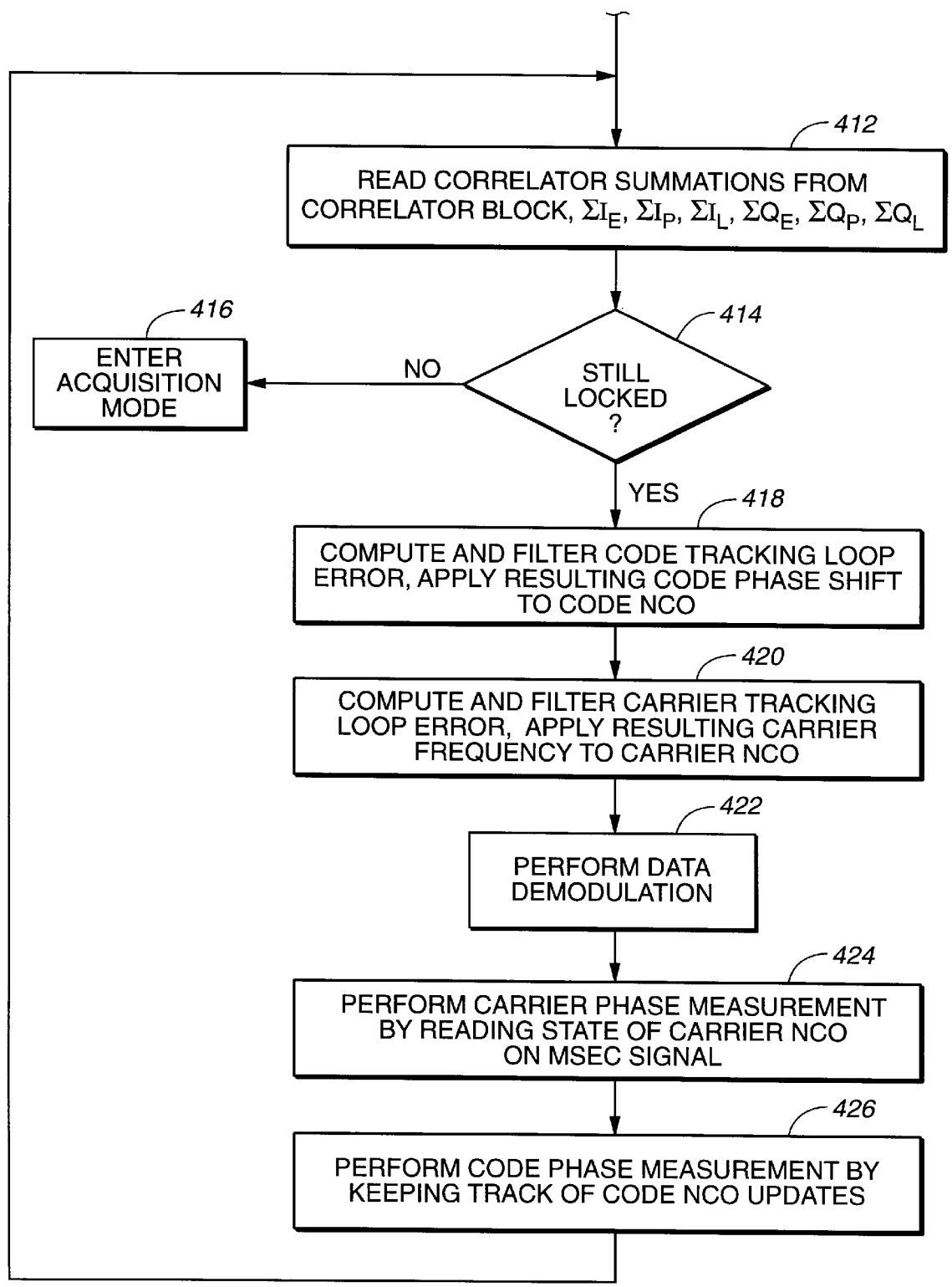
FIG._21

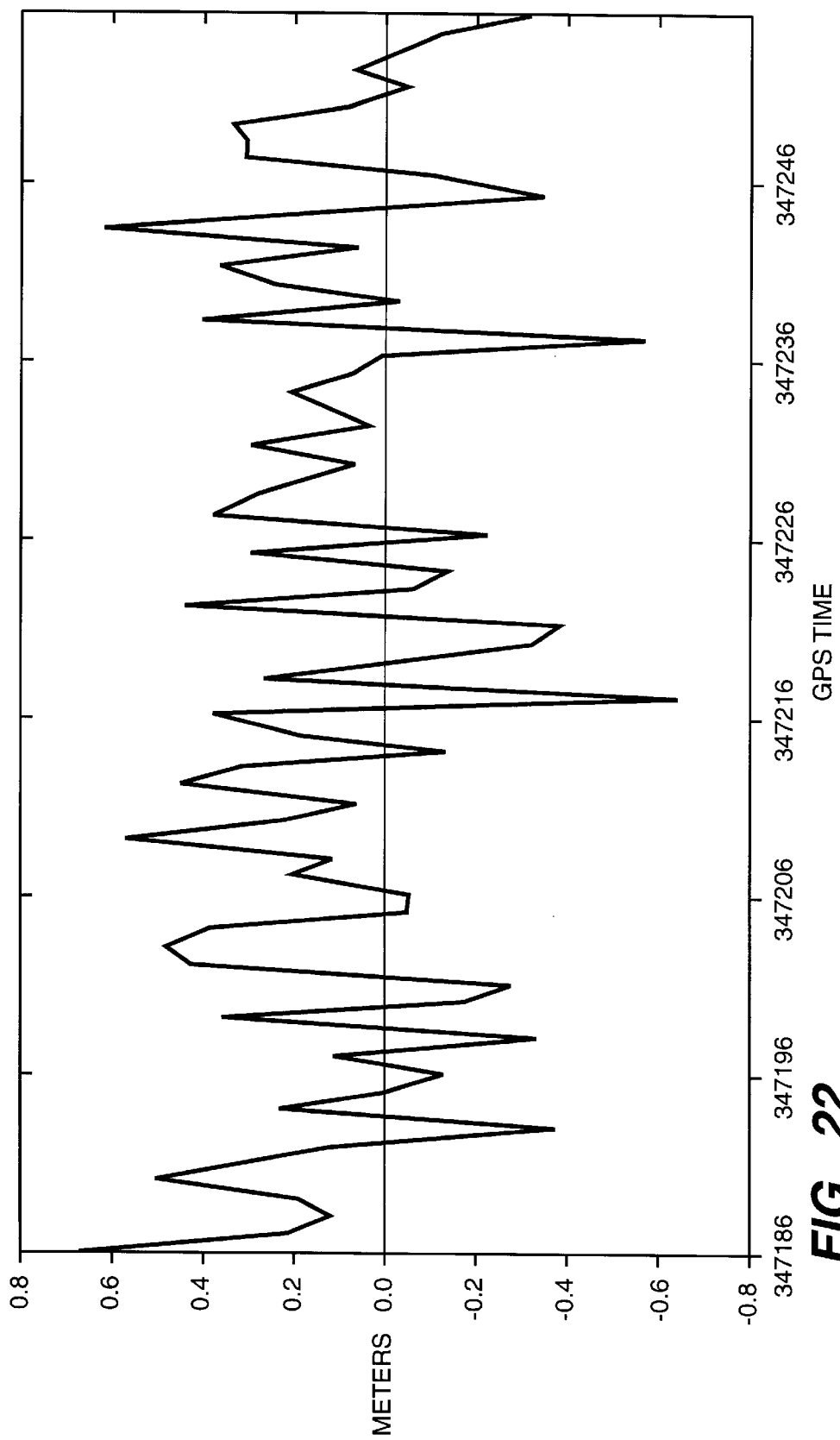
FIG._22

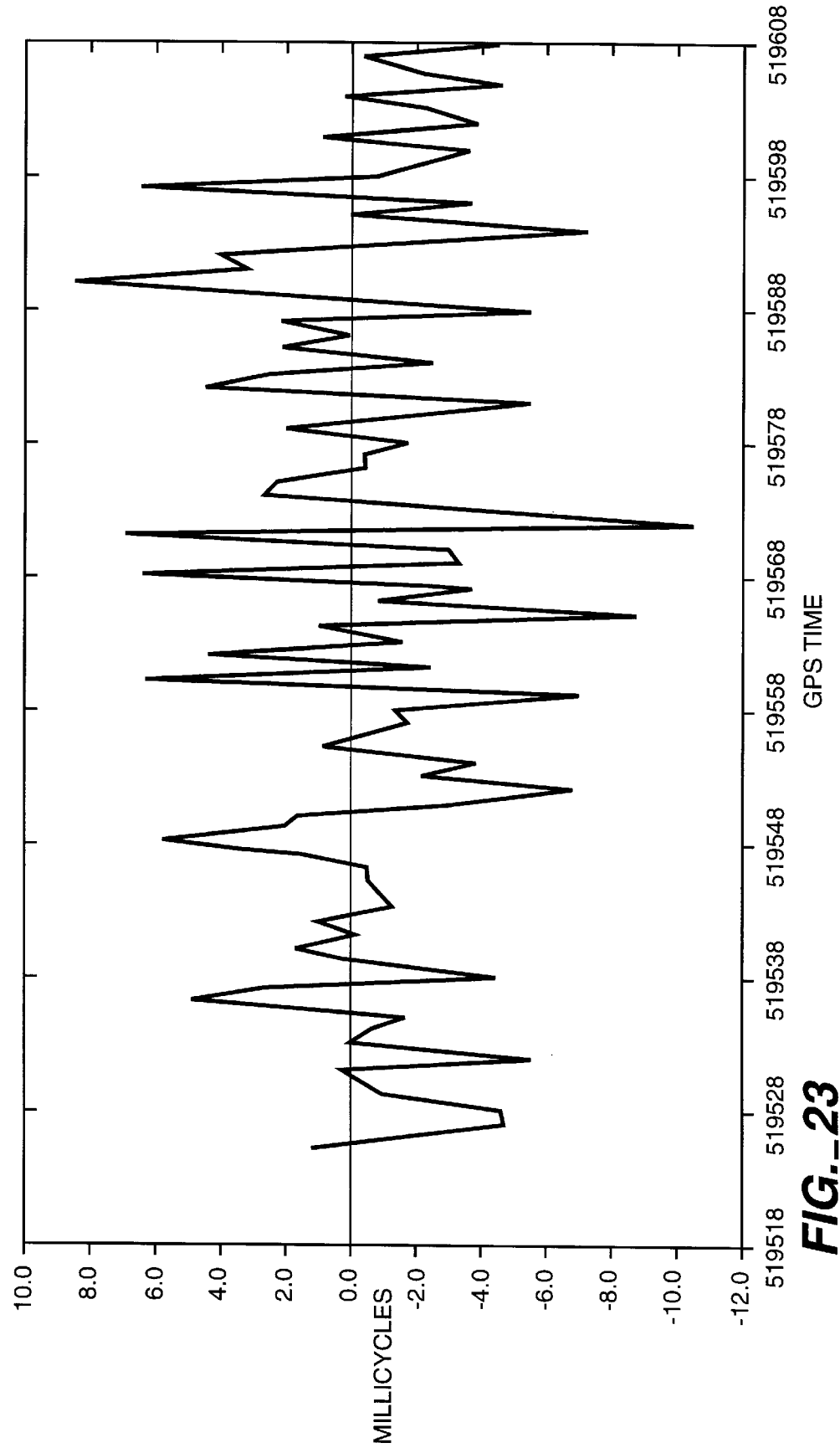
FIG._23

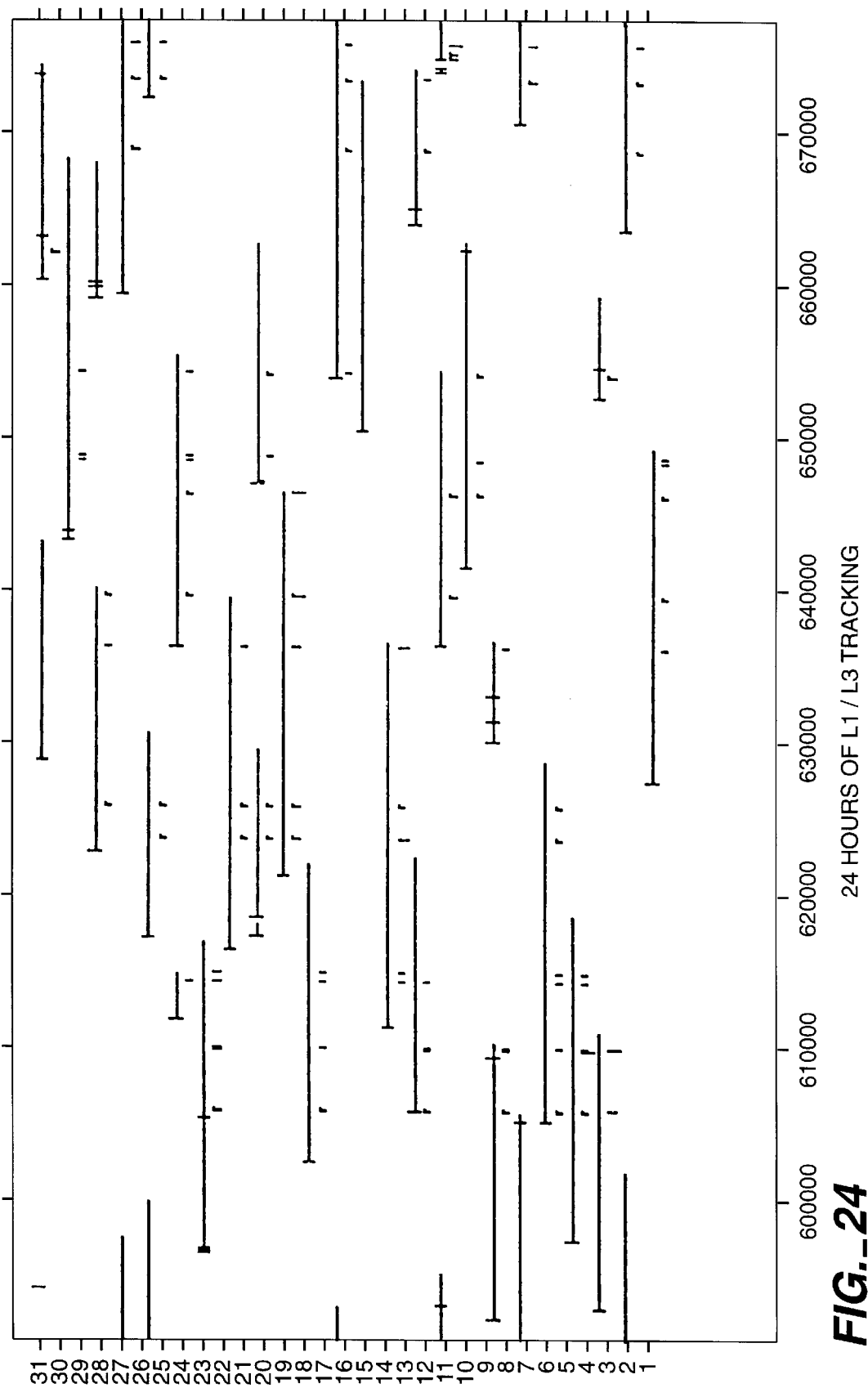
FIG._24

APPARATUS AND METHOD FOR PROCESSING MULTIPLE FREQUENCIES IN SATELLITE NAVIGATION SYSTEMS

BACKGROUND

The invention relates to a satellite positioning system (SPS) receiver capable of receiving multiple satellite signals. The SPS includes different satellite systems. One of those systems is a global positioning system (GPS).

The GPS is a system of satellite signal transmitters, with receivers located on the Earth's surface or adjacent to the Earth's surface, that transmits information from which an observer's present location and/or the time of observation can be determined. There is also the Global Orbiting Navigational System (GLONASS), which can operate as an alternative GPS system.

The GPS is part of a satellite-based navigation system developed by the United States Defense Department under its NAVSTAR satellite program. A fully operational GPS includes up to 24 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to three or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite continuously transmits two spread spectrum, L-band carrier signals: an L1 signal having a frequency f1=1575.42 MHz and an L2 signal having a frequency f2=1227.6 MHz. These two frequencies are integral multiplies f1=154 f0 and f2=120 f0 of a base frequency f0=10.23 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay~$f^2$). This phenomenon is discussed by MacDoran in U.S. Pat. No. 4,463,357, which discussion is incorporated by reference herein. When transit time delay through the ionosphere is determined, a phase delay associated with a given carrier signal can also be determined. The phase delay which is proportional to the time difference of arrival of the modulated signals is measured in realtime by cross correlating two coherently modulated signals transmitted at different frequencies L1 and L2 from the spacecraft to the receiver using a cross correlator. A variable delay is adjusted relative to a fixed delay in the respective channels L1 and L2 to produce a maximum at the cross correlator output. The difference in delay required to produce this maximum is a measure of the columnar electron content of the ionosphere.

Use of the PRN codes allows use of a plurality of GPS satellite signals for determining an observer's position and for providing the navigation information. A signal transmitted by a particular GPS satellite is selected by generating and matching, or correlating, the PRN code for that particular satellite. Some of the PRN codes are known and are generated or stored in GPS satellite signal receivers carried by ground observers. Some of the PRN codes are unknown.

A first known PRN code for each GPS satellite, sometimes referred to as a precision code or P-code, is a relatively long, fine-grained code having an associated clock or chip rate of 10 f0=10.23 MHz. A second known PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=10.23 MHz. The C/A -code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision B-PR, 3 Jul. 1991, which is incorporated by reference herein.

The GPS satellite bit stream includes navigational information on the ephemeris of the transmitting GPS satellite (which includes a complete information about the transmitting satellite within next several hours of transmission) and an almanac for all GPS satellites (which includes a less detailed information about all other satellites). The satellite information transmitted by the transmitting GPS has the parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in *The NAVSTAR Global Positioning System,* Tom Logsdon, Van Nostrand Reinhold, New York, 1992, pp. 17–90.

A second alternative configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of $8/17$ of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9k/16) GHz and f2=(1.246+7k/16) GHz, where k(=1,2, . . . 24) is the channel or satellite number. These frequencies lie in two bands at 1.597–1.617 GHz (L1) and 1,240–1,260 GHz (L2). The L1 code is modulated by a C/A- code (chip rate=0.511 MHz) and by a P-code (chip rate=5.11 MHz). The L2 code is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SPS), such as the Global Positioning System (GPS) or the Global Orbiting Naviga-tion Satellite System (GLONASS), uses transmission of coded radio signals, with the structure described above, from a plurality of Earth-orbiting satellites. An SPS antenna receives SPS signals from a plurality (preferably four or more) of SPS satellites and passes these signals to an SPS signal receiver/processor, which (1) identifies the SPS satellite source for each SPS signal, (2) determines the time at which each identified SPS signal arrives at the antenna, and (3) determines the present location of the SPS satellites.

The range (Ri) between the location of the i-th SPS satellite and the SPS receiver is equal to the speed of light c times ($\Delta t_i$), wherein ($\Delta t_i$) is the time difference between the SPS receiver's clock and the time indicated by the satellite when it transmitted the relevant phase. However, the SPS receiver has an inexpensive quartz clock which is not synchronized with respect to the much more stable and precise atomic clocks carried on board the satellites. Consequently, the SPS receiver actually estimates not the true range Ri to the satellite but only the pseudo-range (ri) to each SPS satellite.

After the SPS receiver determines the coordinates of the i-th SPS satellite by picking up transmitted ephemeris constants, the SPS receiver can obtain the solution of the set of the four equations for its unknown coordinates (x0, y0, z0) and for unknown time bias error (cb). The SPS receiver can also obtain its heading and speed. (See *The Navstar Global Positioning System*, Tom Logsdon, Van Nostrand Reinhold, 1992, pp. 8–33, 44–75, 128–187.) The following discussion is focused on the GPS receiver, though the same approach can be used for any other SPS receiver.

The C/A code modulated phase quadrature carrier component of the L1 signal is provided for commercial use. If the accuracy desired in the quantity being measured by the receiver is not great, it is sufficient to use only the L1 signal carrier. However, for applications where high resolution measurements or fast measurements are to be made, both the L1 carrier and the L2 carrier must also be used, which allows to eliminate the unknown component of the time delay of the signals by the ionosphere.

The GPS signals are intended to be recovered by correlating each incoming signal with a locally generated replica of the code: P-code or C/A code. The result of such correlation is that the carrier in the GPS signals is totally suppressed when the modulating signal is a pseudorange code sequence like the P-code or the C/A code. Thus, the received L2 signal contains no component at the L2 frequency. For the survey applications it is important to be able to reconstruct the L2 carrier and to measure its phase. So long as the P code is not encrypted, the L2 carrier is easily recovered by correlation of the received signal with the locally generated P code replica. The locally generated code is adjusted in timing to provide an optimum correlation with the incoming signal. The correlation output is then a single narrowband peak centered at the carrier frequency. The carrier recovered by correlation provides the best available signal-to-noise ratio (SNR) of the suppressed carrier.

In addition to carrying the navigation and timing payload, the satellites carry a payload that enables them to detect nuclear weapons bursts; this system is called the nuclear detonation (NUDET) detection system (NDS). Each GPS satellite also transmits L3 signal having a frequency f3=135 f0 which is normally turned off. The L3 signal is assigned to the nuclear detonation (NUDET) detection system (NDS).

The NDS includes the X-ray instruments carried on the GPS Block I satellites. They are simple sensors designed to measure the intense burst of X rays that would accompany the atmospheric detonation of a nuclear weapon. Because such a burst would occur in an interval of less than 1 microsecond, the sensors must continuously monitor for such an event. Should such an event occur, data from all the satellites observing the event are transmitted to ground terminals for processing.

Because the X rays from a nuclear detonation would travel outward from the location of the event in what would be essentially a spherical shell expanding at the speed of light, the location of the event can be determined from accurate timing information as part of the measurement at each responding satellite. This case is essentially the reverse of what occurs during navigation operations, in which a receiver at a fixed point receives accurate time marks from several satellites to determine its location. In this first case, the detonation acts as an impulse transmitter. The time differences of arrival (TDOA) at four or more satellites must be measured to calculate the time of the event and its x, y, z coordinates. See "Detecting Nuclear Detonations with GPS" by Paul R. Higbie and Norman K. Blocker in GPS World, February 1994, pp. 48–50. This article is incorporated herein by reference.

However, the L3 signal in combination with L1 and L2 signals can be also used for other purposes in addition to the detection of nuclear events. Indeed, the navigational usage of GPS has changed considerably since its inception. One particular advance has been the extensive use of the carrier phase measurement in processing to provide very high accuracy (millimeter accuracy from carrier, meter level from code). The carrier phase measurement is derived from the transmit carrier wavelength ($\lambda_{L1}$=19 cm; $\lambda_{L2}$=24 cm), whereas the code phase measurement is derived from the code rates ($\lambda_{C/A}$=293 m; $\lambda_{P/Y}$=29.3 m). Thus, the carrier phase measurement gives a substantial improvement in accuracy for many applications. The carrier phase based solutions are used in high accuracy modes such as RTK (Real-Time Kinematic) in applications such as surveying, aircraft landing and earthquake monitoring.

In current state-of-the-art systems the most accurate and reliable GPS receivers use combinations of L1 and L2 code and carrier phase measurements to solve for the vector between two points. The code phase measurements are used primarily to reduce the search volume of the carrier phase ambiguity. The code phase measurement is unambiguous up to its length (1 millisecond for C/A and 1 week for P(Y)) i.e. a receiver can easily identify which part of the signal is currently being received. The carrier phase measurement is subject to the fact that each carrier cycle looks like every other carrier cycle. Solving this problem to reveal which cycle is being received is known as the cycle ambiguity problem. An initial estimate of which carrier cycle is correct is provided by the less accurate code phase measurement. This reduces the problem of searching for the correct carrier phase cycle candidate to a three dimensional search volume of many candidates. The number of candidates to search may be improved by reducing the search volume via improved code phase measurements (i.e. improved multipath mitigation etc.). The search volume presents a carrier phase cycle candidate every 19 cm for L1 and 24 cm for L2 along the vector between each satellite and the receiving antenna. Hence, L2 provides slightly less candidates within a given search volume, thus improving the probability of finding the correct candidate. Another technique used to reduce the number of candidates in the search volume is the widelane carrier phase. The widelane carrier phase is formed by combining L1 and L2 carrier phase measurements to give a wavelength, 86 cm, corresponding to difference of the two frequencies. Use of the widelane carrier phase substantially improves the probability of finding the correct widelane carrier cycle although there is also a multiplication of the individual errors from the L1 and L2 carrier phase measurements in the widelane solution. The widelane carrier phase can then be used to search for the L1 and/or L2 cycle ambiguity, improving the accuracy of the result at each stage.

Introduction of the set of measurements including the L1, L2, and L3 carrier phases allows one to significantly improve the widelane carrier phase capabilities by providing several widelane carrier phases.

One can combine L1 and L2 carrier phase measurements to remove the ionospheric error over long baselines (10 kms). The ionospheric error decorrelates over long baselines making it very difficult to find standalone L1 or L2 cycle ambiguities. The additional L3 measurement allows one to reduce the L1 and L2 cycle ambiguities.

Another important practical problem is signal jamming. There are many techniques for reducing receiver susceptibility to jamming, including multi-bit quantization. However, the signal denial, that is substantially reduced signal-to-noise ratio (SNR) due to jamming, is still a major problem. The usage of three signals L1, L2, and L3 would increase the SNR by providing the redundant signals such that if one signal frequency is jammed the dual frequency widelane and ionospherically corrected type processing is still possible.

The above given applications are described in terms of the L3 signal but are equally applicable to other non-navigational signals emanating from the satellites. All these applications require the use of the satellite signal correlation receiver capable of receiving the multiple satellite signals.

SUMMARY

The present invention is unique because it allows to design a SPS receiver capable of processing the multiple satellite signals.

One aspect of the present invention is directed to a system for optimum correlation processing of at least three signals M1, M2, and M3 emanating from the same satellite belonging to the satellite positioning system (SPS). The system comprises: (1) a RECEIVING CIRCUIT for receiving and preparing for processing each M1, M2, and M3 signal; and (2) a DIGITAL SIGNAL PROCESSING CIRCUIT for processing each M1, M2, and M3 signal in order to perform the code and carrier measurements to solve for user's position, velocity, and time coordinate, wherein the availability of at least three M1, M2, and M3 signals increases the accuracy and robustness in finding the user's position, velocity, and time coordinate.

Another aspect of the present invention is directed to a system for optimum correlation processing of at least three L1, L2, and L3 signals received from a SPS satellite by a SPS RECEIVER. The system comprises: (1) a RECEIVING CIRCUIT for receiving a known C/A code and a known P(Y) code modulated on L1 carrier frequency signal, for receiving a known P(Y) code modulated on L2 carrier frequency signal, and for receiving a known C/A code modulated on L3 carrier frequency from at least one satellite; wherein the received L1, L2, and L3 signals contain propagation noise; and (2) at least one DIGITAL CHANNEL PROCESSING CIRCUIT. Each DIGITAL CHANNEL PROCESSING CIRCUIT performs the following operations: (1) locally generates replica of the C/A code modulated on L1 carrier frequency signal and on L3 carrier frequency; (2) locally generates replica of the P(Y) code modulated on L1 carrier frequency signal and on L2 carrier frequency signal; (3) correlates a locally generated replica of C/A or P(Y) code with the received L1 code for obtaining an estimate of L1 group delay (L1 pseudo-range) and L1 carrier phase; (4) correlates a locally generated replica of P(Y) code with the received L2 code for obtaining an estimate of L2 group delay (L2 pseudo-range) and L2 carrier phase; and (5) correlates a locally generated replica of C/A code with the received L3 code for obtaining an estimate of L3 group delay (L3 pseudo-range) and L3 carrier phase.

In the preferred embodiment, the RECEIVING CIRCUIT further comprises: (1) a triple frequency patch ANTENNA CIRCUIT for receiving the L1, L2, and L3 satellite signals; (2) a FILTER/LNA CIRCUIT for performing filtering and low noise amplification of the L1, L2, and L3 signals, wherein the FILTER/LNA determines the signal-to-noise ratio of the received signals L1, L2, and L3; (3) a DOWN-CONVERTER CIRCUIT for mixing and converting the L1, L2, and L3 signals; (4) an IF PROCESSOR CIRCUIT for transforming the converted L1, L2, and L3 signals into digitally sampled quadrature versions of L1, L2, and L3 signals (IL1, QL1, IL2, QL2, IL3, QL3); (5) a MASTER OSCILLATOR CIRCUIT; and (6) a FREQUENCY SYNTHESIZER CIRCUIT for generating several timing signals.

In the preferred embodiment, each DIGITAL CHANNEL PROCESSING CIRCUIT further comprises: (1) an L1 TRACKER CIRCUIT for locally generating replica of the C/A code and the P(Y) code modulated on L1 carrier frequency signal, for tracking an L1 satellite signal, and for correlating the locally generated replica of C/A and P(Y) code with the received L1 code for obtaining an estimate of L1 group delay (L1 pseudo-range) and L1 carrier phase; (2) an L2 TRACKER CIRCUIT for locally generating replica of the P(Y) code modulated on L2 carrier frequency signal, for tracking an L2 satellite signal, and for correlating the locally generated replica of P(Y) code with the received L2 code for obtaining an estimate of L2 group delay (L2 pseudo-range) and L2 carrier phase; (3) an L3 TRACKER CIRCUIT for locally generating replica of the C/A code modulated on L3 carrier frequency signal, for tracking an L3 satellite signal, and for correlating the locally generated replica of C/A code with the received L3 code for obtaining an estimate of L3 group delay (L3 pseudo-range) and L3 carrier phase; and (4) a MICROPROCESSOR CIRCUIT system.

The L1 TRACKER CIRCUIT is fed by digitized inphase IL1 and quadrature QL1 of L1 signal outputted by the IF PROCESSOR CIRCUIT, wherein the L2 TRACKER CIRCUIT is fed by digitized inphase IL2 and quadrature QL2 of L2 signal outputted by the IF PROCESSOR CIRCUIT, and wherein the L3 TRACKER CIRCUIT is fed by digitized inphase IL3 and quadrature QL3 of L3 signal outputted by the IF PROCESSOR CIRCUIT. Each L1, L2, and L3 TRACKER CIRCUIT is synchronously clocked by the SCLK signal and synchronously referenced by the MSEC signal to local reference time; the SCLK and MSEC signals being outputted by the FREQUENCY SYNTHESIZER CIRCUIT. The MICROPROCESSOR CIRCUIT system is fed by output signals from the L1 TRACKER CIRCUIT, from the L2 TRACKER CIRCUIT, and from the L3 TRACKER CIRCUIT, and the L1 TRACKER CIRCUIT, the L2 TRACKER CIRCUIT, and the L3 TRACKER CIRCUIT are fed by CONTROL signal generated by the MICROPROCESSOR CIRCUIT.

One more aspect of the present invention is directed to a method for optimum correlation processing of at least three signals M1, M2, and M3 emanating from the same satellite belonging to the satellite positioning system (SPS). The method comprises the steps of: (1) receiving and preparing for processing each M1, M2, and M3 signal by a RECEIVING CIRCUIT; and (2) processing each M1, M2, and M3 signal in order to perform the code and carrier measurements to solve for user's position, velocity, and time coordinate by a DIGITAL SIGNAL PROCESSING CIRCUIT.

Yet, one additional aspect of the present invention is directed to a method for optimum correlation processing of at least three L1, L2, and L3 signals received from a SPS satellite by a SPS RECEIVER. The method comprises the steps of: (1) receiving a known C/A code and a known P(Y) code modulated on L1 carrier frequency signal from at least one satellite; (2) receiving a known P(Y) code modulated on L2 carrier frequency signal from at least one satellite; (3) receiving a known C/A code modulated on L3 carrier frequency from at least one satellite; (4) locally generating replica of the C/A code modulated on L1 carrier frequency; (5) locally generating replica of the C/A code modulated on L3 carrier frequency; (6) locally generating replica of the P(Y) code modulated on L1 carrier frequency; (7) locally generating replica of the P(Y) code modulated on L2 carrier frequency; (8) correlating the locally generated replica of C/A code with the received L1 code for obtaining an estimate of L1 group delay (L1 pseudo-range) and L1 carrier phase; (9) correlating the locally generated replica of P(Y) code with the received L1 code for obtaining an estimate of L1 group delay (L1 pseudo-range) and L1 carrier phase; (10) correlating the locally generated replica of P(Y) code with the received L2 code for obtaining an estimate of L2 group delay (L2 pseudo-range) and L2 carrier phase; and (11) correlating the locally generated replica of C/A code with the received L3 code for obtaining an estimate of L3 group delay (L3 pseudo-range) and L3 carrier phase.

BRIEF DESCRIPTION OF THE DRAWINGS

FIG. 1 illustrates a signal analysis apparatus used to determine the L3 signal characteristics.

FIG. 2 shows a plot of L3 signal when it is transmitting.

FIG. 3 depicts a plot for an L1 C/A code emanating from a selected satellite.

FIG. 4 illustrates an L3 C/A code emanating from the satellite of FIG. 3.

FIG. 5 shows the spectral lines that are characteristic of the C/A code transmitted on L1 carrier frequency at 1 kHz intervals.

FIG. 6 is an illustration of the spectral lines that are characteristic of the C/A code transmitted on L3 carrier frequency at 1 kHz intervals for the satellite of FIG. 5.

FIG. 7 depicts a plot of the I correlator for the L3 transmission.

FIG. 8 shows a plot of the Q correlator for the L3 transmission.

FIG. 9a illustrates L1 data signal constellation possibilities.

FIG. 9b depicts L3 data signal constellation possibilities.

FIG. 10 shows a normal L3 transmission characteristic on the Spectrum Analyzer with fast sweep time (500 milliseconds).

FIG. 12 illustrates a second burst transmission (approximately 80 milliseconds) with fast (500 milliseconds) sweep time from the satellite of FIG. 10.

FIG. 13 shows a block diagram of the RECEIVER designed for processing L1, L2, and L3 signals.

FIG. 14 illustrates a FILTER/LNA of the RECEIVER of FIG. 13.

FIG. 15 depicts a MASTER OSCILLATOR and FREQUENCY SYNTHESIZER of the RECEIVER of FIG. 13.

FIG. 16 shows a DOWNCONVERTER of the RECEIVER of FIG. 13.

FIG. 17 illustrates an IF PROCESSOR of the RECEIVER of FIG. 13.

FIG. 18 is a depiction of a DIGITAL CHANNEL PROCESSOR of the RECEIVER of FIG. 13.

FIG. 19 is an illustration of an L1 TRACKER.

FIG. 20a shows a typical L1 acquisition mode.

FIG. 20b depicts a typical L2 acquisition mode.

FIG. 20c illustrates an L3 acquisition mode.

FIG. 21 shows a typical tracking mode.

FIG. 22 illustrates zero baseline double difference code phase measurements using L3 code.

FIG. 23 depicts zero baseline double difference carrier phase measurements using L3 code.

FIG. 24 shows L3 transmission over a 24 hour period.

FULL DESCRIPTION OF THE PREFERRED EMBODIMENT

Figure 11:
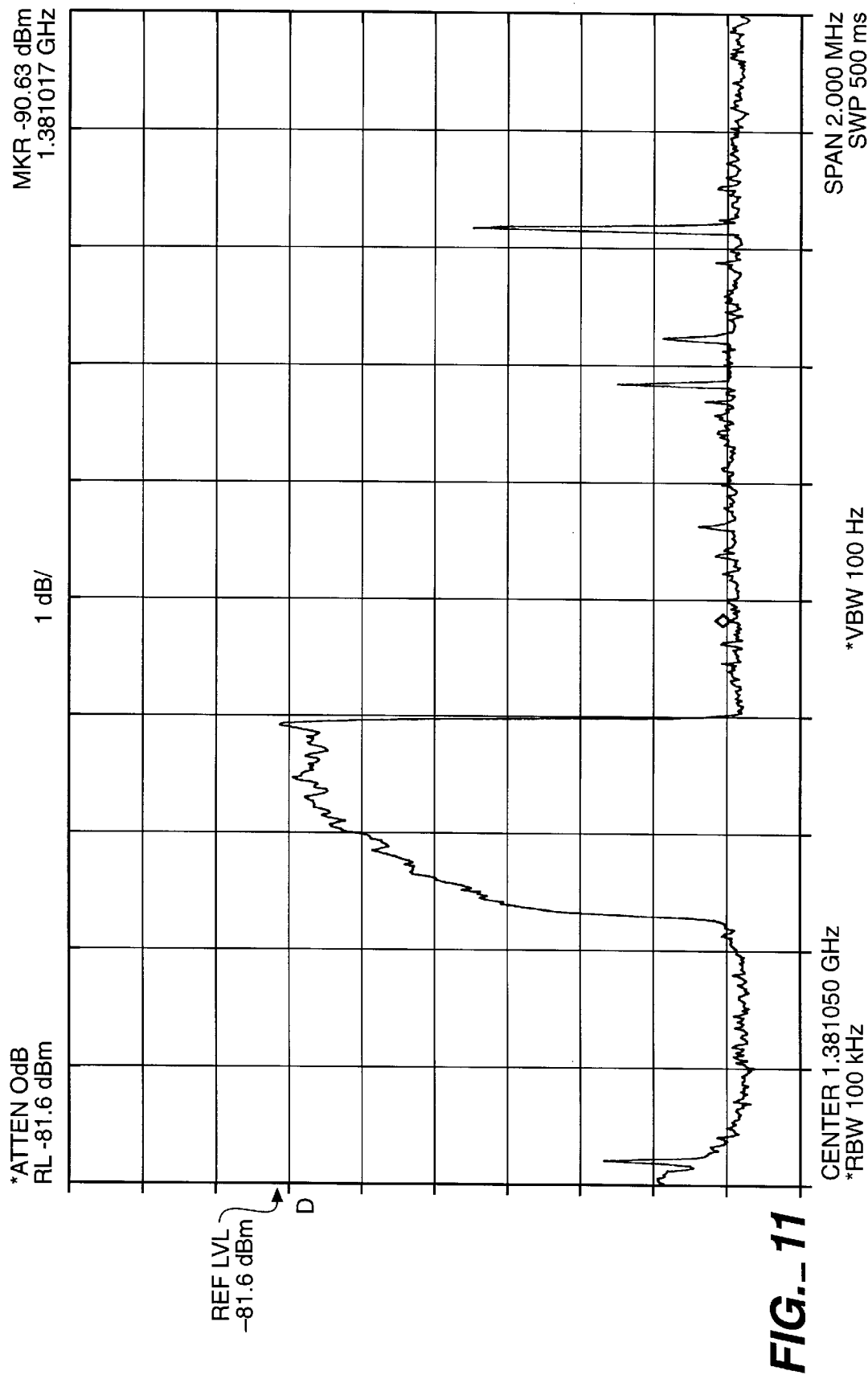
FIG. 11 depicts a first burst transmission (approximately 80 milliseconds) with fast (500 milliseconds) sweep time from the satellite of FIG. 10.

FIG. 1 illustrates the apparatus 10 used to determine the L3 signal characteristics. A high gain (~27 dB) steerable parabolic dish forms the ANALYSIS ANTENNA (12). The ANTENNA output is filtered and low noise amplified in the FILTER/LNA (16). The ANTENNA's feed and the FILTER/LNA frequency characteristics are conducive to receiving L1 (1575.42 MHz) and L3 (1381.05 MHz) with bandwidth of approximately 30 MHz in each case. The output signal (18) from the FILTER/LNA block is fed to a DOWNCONVERTER (20) and to a SPECTRUM ANALYZER (22). The SPECTRUM ANALYZER (Model No. 8563A, manufactured by Hewlett Packard, Palo Alto, Calif.) allows one to analyze the incoming signal 14 in the frequency domain.

The DOWNCONVERTER block frequency translates the L1 and L3 input signals to lower frequency. The L1 input signal of 1575.42 MHz frequency is downconverted to L1 signal 40 of 175.42 MHz via the first local oscillator signal LO1 of 1400 MHz (26), wherein the L3 input signal of 1381.05 MHz is downconverted to L3 signal 42 of 179.4 MHz via the third oscillator signal LO3 of 160.45 MHz (28). The local oscillator signals (LO) are synthesized in the FREQUENCY SYNTHESIZER block 30 using the 10 MHz output (31) from the MASTER OSCILLATOR block 32.

The IF PROCESSOR (44) frequency translates the L1 signal (40) from 175.42 MHz to 420 kHz via LO2 signal (34) of 175 MHz. The L3 signal (42) is translated from 179.4 MHz to 4.4 MHz via LO2 (34). The IF PROCESSOR (44) generates inphase (I) and quadrature (Q) sampled (at rate SCLK of 25 MHz) versions of L1 signal on carrier frequency 420 kHz and L3 signal on carrier frequency 4.4 MHz. The IL1 signal (46) and QL1 signal (48) includes the C/A and P(Y) code modulations. The IL3 and QL3 signals include all possible code modulations on L3 signal.

The DIGITAL CHANNEL PROCESSORs (56) (one per satellite) further process the IF PROCESSOR output signals to track the modulating code (C/A or P(Y)) in both code and carrier. The MICROPROCESSOR SYSTEM 62 controls the search and lock to the particular satellite by the corresponding DIGITAL PROCESSOR CHANNEL. The MICROPROCESSOR SYSTEM 62 also performs code and carrier phase measurements, loop locking, and data demodulation and decoding. The MICROPROCESSOR SYSTEM 62 passes any processed measurements and data to a NAVIGATION PROCESSOR (64) for further high level processing dependent on application.

Using the SPECTRUM ANALYZER, the L3 signal was found to transmit intermittently. FIG. 2 depicts the signal L3 when it is transmitting. The modulation has a similar spectral profile to the known L1 C/A code. FIGS. 3 and 4 show narrower bandwidth plots for the L1 C/A code and the L3 code on the same satellite. It is clear from the similarities in spectral content of FIGS. 3 and 4 that L3 transmits the same C/A code as L1 for a given satellite.

Given that L3 transmits a known C/A code, the SIGNAL ANALYSIS APPARATUS of FIG. 1 was set up to track C/A code on L1 and C/A code on L3. L1 C/A code is always transmitted. Thus, the apparatus is set up to constantly track L1 and to lock to L3 when it transmits. It is assumed that the L3 C/A transmission is locked in phase and frequency with the L1 C/A transmission, i.e. the satellite uses the single oscillator to derive all frequencies and clocks. This assumption allows the search for L3 signal to be very rapid as both approximate code phase and carrier frequency can be derived from the L1 C/A code and carrier tracking loops. L3 carrier frequency is estimated by multiplying the L1 carrier frequency offset by 135/154, i.e. the ratio of the transmit frequencies. Thus, the SIGNAL ANALYSIS APPARATUS of FIG. 1 was able to lock to the L3 transmission quickly when it came on.

FIG. 5 shows the spectral lines that are characteristics of the C/A code on L1. Spectral lines are shown at 1 kHz intervals because the C/A code repeats itself every 1 millisecond. FIG. 6 depicts the equivalent spectral content on L3. The lock quality is erratic and the spectral content is different as compared with FIG. 5. Power is always observed at the output of the DIGITAL CHANNEL PROCESSOR CORRELATORs, indicating that there is another modulation scheme on top of the C/A code on L3.

FIGS. 7 and 8 show plots of the I and Q correlators for the L3 transmission, one point per millisecond worth of correlation. The Q correlator has a constant amplitude close to zero, but the I correlator comprises up to 12 amplitude states. The 12 amplitude state extra modulation on L3 is designed to convey the nuclear event sensor information. FIGS. 9a and 9b show the IQ possible state diagrams for L1 and L3 respectively. The L1 signal has only two amplitude states (N=2) being transmitted at clock data modulation frequency rate 50 Hz. Therefore, L1 data transmission rate is DCLK* $\log_2$ N=(50 Hz)* $\log_2$ 2=50 Baud. Here DCLK is a clocking rate of the data transmission. The L3 signal includes 12 different IQ amplitude states (N=12) being transmitted at a rate of 1 kHz. Therefore, L3 data transmission rate is DCLK* $\log_2$ N=(1000 Hz)* $\log_2$ 12 Baud. The L3 code and carrier tracking loops have to be adjusted to track in the presence of this modulation. Specifically, the L3 code and carrier tracking loops have to be scaled by the I correlator to resist tracking errors due to amplitude swings.

Typical L3 transmission times were between 30 and 100 seconds, although much longer transmissions (10 to 30 minutes) have been observed. Occasionally the satellites transmit a burst mode. FIG. 10 depicts a normal L3 transmission characteristic on the SPECTRUM ANALYZER with fast (500 milliseconds) sweep time. FIGS. 11 and 12 show burst transmissions from the same satellite on the same fast sweep time. These transmissions last approximately 80 milliseconds.

The received power on L3 C/A is approximately 1.5 dB stronger than the received power on L1 C/A. This allows to use a hemispherically patterned antenna for L3 i.e. the standard antenna pattern normally used in GPS navigation.

Table 1 summarizes characteristics of the L1, L2 and L3 transmissions.

TABLE 1

|  | L1 | L2 | L3 |
|---|---|---|---|
| Carrier (MHz) | 1575.42 | 1227.6 | 1381.05 |
| Carrier ($f_0$) | 154 | 120 | 135 |
| Codes | C/A and P(Y) | P(Y) | C/A |
| Data amplitude | 2 states | 2 states | 12 states |
| Data rate | 50 Baud | 50 Baud | $\log_2$12 kHz |

FIG. 13. depicts a block diagram of a RECEIVER 100 designed for processing L1, L2 and L3 signals. The GPS signals (L1=1575.42 MHz, L2=1227.60 MHz and L3=1381.05 MHz) enter through a hemispherically patterned triple frequency patch ANTENNA 110. The MASTER OSCILLATOR 124 provides the reference oscillator with frequency 10 MHz which drives all other clocks in the system. The FREQUENCY SYNTHESIZER 122 takes the output of the MASTER OSCILLATOR and generates important clock and local oscillator frequencies used throughout the system.

A FILTER/LNA 112 performs filtering and low noise amplification of L1, L2 and L3 signals. The noise figure of the RECEIVER system is dictated by the performance of the FILTER/LNA combination. The DOWNCONVERTER 114 mixes L1, L2 and L3 signals down in frequency and outputs the analog L1, L2 and L3 signals into an IF PROCESSOR 140. The IF PROCESSOR takes the analog L1, L2 and L3 signals and converts them into the digitally sampled inphase and quadrature IL1, QL1, IL2, QL2, IL3, QL3.

The DIGITAL CHANNEL PROCESSOR blocks 142 process the digitally sampled output signals IL1, QL1, IL2, QL2, IL3, QL3. All DIGITAL CHANNEL processors are identical by design and operate on identical input samples. Each DIGITAL CHANNEL PROCESSOR is designed to digitally track the L1, L2 and L3 signals produced by one satellite by tracking code and carrier signals and to perform code and carrier phase measurements in conjunction with the MICROPROCESSOR SYSTEM 144. One DIGITAL CHANNEL PROCESSOR is capable of tracking one satellite in all L1, L2 and L3 channels. MICROPROCESSOR SYSTEM is a general purpose computing device which facilitates tracking and measurements processes, providing pseudorange and carrier phase measurements for a NAVIGATION PROCESSOR 148. The NAVIGATION PROCESSOR performs the higher level function of combining measurements in such a way as to produce position, velocity and time information for the differential and surveying functions.

FIG. 14 shows the detailed embodiment of the FILTER/LNA 140. The L1/L2/L3 signal from the ANTENNA 110 is power split by POWERSPLITTER 160 into L1, L2 and L3 signals that are separately bandpass filtered by the BANDPASS FILTERs 168, 170 and 172 with bandwidth BW=30 MHz. Filtered signals are recombined in a POWER COMBINER 174 before being fed into the low noise amplifier LNA 176. The output signal 118 represents filtered and amplified L1/L2/L3 signal.

The FREQUENCY SYNTHESIZER 122 of FIG. 13 is depicted in FIG. 15 in more detail. The MASTER OSCILLATOR 124 generates the 10 MHz signal 181 that is divided by 2 in the DIVIDE BY 2 block 182.

The 5 MHz signal 184 is compared with the 5 MHz signal output from a block "DIVIDE BY 5" 188 in a PHASE DETECTOR 186. The voltage output from the PHASE DETECTOR represents phase alignment of two 5 MHz signals and includes two signals, wherein the first of these signals has a large phase error and represents a large voltage output; and wherein the second of these signals has a small phase error and represents a small voltage output. A LOOP FILTER 190 filters out the high frequency voltage noise signal having a large phase error and outputs the low frequency noise signal 191 having a small phase error which is applied to a voltage controlled oscillator (VCO) 192. The low frequency noise signal 191 causes frequency change in the VCO output signal 120. When the loop is locked, the VCO output signal 120 having a 1400 MHz frequency is used as the 1st LO1 (local oscillator) signal. By dividing the 1st LO1 signal by 8, a block "DIVIDE BY 8" (196) outputs the 2nd LO2 local oscillator signal 126 having 175 MHz. A block "DIVIDE BY 7" (194) divides the LO2 signal and outputs the sampling clock (SCLK) signal 130 having 25 MHz. A block 198 "DIVIDE BY 25000" further divides the SCLK signal and outputs the MSEC signal 150 having 1 KHz which is used by the system for measurement of local reference time. A "DIVIDE BY 5" block 188 is used to close the LO1 loop. The block "Multiply by 2" (180) generates a 4th LO4 local oscillator signal (128) having 20 MHz.

The DOWNCONVERTER 114 is depicted in detail in FIG. 16 which decreases the frequency of the L1/L2/L3 signal outputted by the FILTER/LNA. The L1/L2/L3 signal output 118 from the FILTER/LNA shown in FIG. 15 is split in a POWERSPLITTER 200 into three signals. The L1 signal (201) is frequency translated from 1575.42 MHz into 175.42 MHz via LO1 clock signal and a MIXER 202, then bandpass filtered with bandwidth BW=25 MHz, and amplified to produce an L1 output signal 115. The L2 signal (203) is frequency translated from 1227.6 MHz to 172.4 MHz via LO1 clock signal and a MIXER 210. The BANDPASS FILTER (210) then bandpass filters the L2 signal and an AMPLIFIER 216 amplifies it to produce an L2 output signal 117. The L3 signal (205) is frequency translated from 1381.05 MHz to 18.95 MHz via LO1 signal and a MIXER 212, then bandpass filtered and amplified to produce an L3 (119) output.

FIG. 17 describes an IF (intermediate frequency) PROCESSOR (130). which has as input signals the L1 (175.42 MHz) signal 115, the L2 (172.4 MHz) signal (117) and the L3 (18.95 MHz) signal 119 outputted by the DOWNCONVERTER 114.(See FIG. 16). The IF PROCESSOR also uses the 2nd. LO2 signal 126, the LO4 signal 128, and the SCLK signal 130 outputted by the FREQUENCY SYNTHESIZER 80. The POWERSPLITTERs 230, 232, and 236 split the L1, L2 and the L3 signals into inphase (I) and quadrature(Q) versions of L1, L2 and L3 signals. The inphase (I) version 240 of the LO2 signal and generated by a 234 block 90° the quadrature (Q) version 240 of the 2nd LO2 signal (175 MHz) are multiplied by the L1 signal in the MULTIPLIERs 240 and 242 to produce the inphase version IL1 and the quadrature version QL1 of the L1 signal at frequency 420 kHz=175.42 MHz −175 MHz and at 25 MHz sampling rate. Similarly, the inphase IL2 and the quadrature QL2 versions of the L2 signal at frequency 2.6 MHz=(175 MHz −172.4 MHz) and at 25 MHz sampling rate are generated in the MULTIPLIERS 244 and 246. The inphase IL3 and the quadrature QL3 versions of the L3 signal at frequency 1.05 MHz=(20 MHz −18.95 MHz) and at 25 MHz sampling rate are generated in the MULTIPLIERS 260 and 262, wherein the LO4 clock signal (128) with frequency 20 MHz is used for the mixing operation. The IL1 signal is lowpass filtered by a LOWPASS FILTER 252 with the BW=12.5 MHz which satisfies the Nyquist Theorem for 25 MHz sampling rate of the IL1 signal, amplified by an AMPLIFIER 264, converted by an A/D CONVERTER 276, and sampled by clocking the input signal through a 288 FLIP-FLOP 1 at sampling clock (SCLK) rate. The A/D conversion can be performed by using an L-bit quantization operation, L being an integer greater or equal to 1. If L=1, the 1-bit quantization is performed and the output signal 151 contains only the Most Significant Bit (MSB) of the IL1 signal at 420 kHz. The IL2, IL3, QL1, QL2, and QL3 signals are similarly processed by the IF PROCESSOR.

The signals IL1, QL1, IL2, QL2, IL3, QL3 including codes and data modulation are sent to the DIGITAL CHANNEL PROCESSORs for further processing.

A DIGITAL CHANNEL PROCESSOR 142 (the number of channels is equal to the number of satellites that are available for reception by the GPS ANTENNA) given in FIG. 18 includes three main subprocessors: an L1 TRACKER 300, an L2 TRACKER 302, and an L3 TRACKER 304 which are controlled by the MICROPROCESSOR SYSTEM 144. The inputs represent the digital signals IL1 151, IL2 153, IL3 155, QL1 152, QL2 154, and QL3 156 outputted by the IF PROCESSOR as shown in FIG. 17. The timing signals SCLK 130 and MSEC 150 are supplied by the FREQUENCY SYNTHESIZER. Each of the digital trackers operates in a substantially similar way. Hence, all digital trackers will be discussed with reference to the L1 TRACKER.

The L1 TRACKER 300 (see FIG. 7) designed for tracking L1 signal. The principles of the GPS signal tracking and acquisition are described in the article authored by J. J. Spilker and entitled "GPS Signal Structure and Performance Characteristics", pp 47–53, published in Global Positioning System, Vol. I, by The Institute of Navigation, 1980, Alexandria, Va. This article is incorporated herein by reference.

The RECEIVER can track the received GPS signals having very low signal levels by using a Delay-Lock Loop. The essential element of the Delay-Lock Loop is the block 320 CORRELATORS 1, wherein the received code is multiplied by a reference code having a time offset τ<T; T being a code chip interval. The code correlation is performed at 3 time points (E-early, P-punctual and L-late) on the autocorrelation function graph. The E, P, and L samples of the autocorrelation function are integrated in the block CORRELATOR 1. However, the CORRELATORs 1 output itself is not sufficient for code tracking because it does not provide an indication of the sign of the delay error of a tracking reference signal. Therefore, in the Delay-Lock Loop the outputs of the E and L correlation are subtracted to form a correlation signal. This correlation signal in the DIGITAL CHANNEL PROCESSOR becomes a number signal which is used to drive a numerically-controlled oscillator (the block 326 CODE NCO 1) or clock. This clock CODE NCO 1 in turn drives the CODE GENERATOR 1 (324) in such a manner that if the clock is lagging in phase, the correction signal drives the clock faster and the reference code speeds up and runs in coincidence with the received signal. Thus, the reference code is tracking the received code. The epoch time ticks are then a measure of the received signal time. The RECEIVER also contains a coincident or punctual (P) channel.

If the received signal delay increases suddenly because of user platform motion the delay error increases momentarily and the correction signal increases from zero. The reference code then slows down and increases its delay until it matches the received signal at which point the correction signal decreases to zero again. Thus, given an initial small error and sufficiently slow dynamics of delay change relative to the filter bandwidth, the Delay-Lock-Loop will track the incoming signal. Once the code tracking has been accomplished by the Delay-Lock-Loop, the BPSK satellite signal data at 50 bps can be recovered by the punctual channel (P).

The satellite signal acquisition should be accomplished before the signal tracking is accomplished. The tracking performance discussion of the GPS signals has assumed that somehow the reference code tracking error has been decreased to less than +1 code chip error. Initially the user RECEIVER may have little knowledge of its exact position and there may be a significant uncertainty as to the relative Doppler effect. With the C/A code there are a limited number, 1023, of code chips in the period; hence even with no initial knowledge of position relative to the satellite, one need only search a maximum of 1023 code chips. If acquisition of the C/A code of one satellite can be accomplished within acquisition time T, then the total acquisition time for 4 satellites can be 4T if a single RECEIVER is time sequenced over the four satellites.

Referring again to FIG. 19, the locally generated code, C/A code or P(Y) code, is selected under the control of the 322 MULTIPLEXER 1. The 312 CARRIER NCO 1 has output inphase I signal 314 and quadrature Q signal 316 which are inphase and quadrature digital carrier at a rate which is phase locked to incoming signals via MICROPROCESSOR control of its output frequency. The input sampled signals IL1 151 and QL1 152 (at carrier frequency 420 kHz) are sent to the 310 COMPLEX MIXER 1 which uses the output I (314) and Q (316) signals from the CARRIER NCO 1 to perform the frequency translation of the IL1 and QL1 signals from 420 kHz to baseband frequency. Thus, the carrier frequency is removed at this stage. The CARRIER NCO 1 block also performs the carrier phase measurements on the edge of MSEC signal 150. The output samples of the COMPLEX MIXER 1 (I signal 336 and Q signal 338) and a locally generated by a CODE GENERATOR 1 (324) replica of C/A (330) or P(Y) code (332) are fed to a 318 CODE MIXER 1 which performs the code correlation. In the case of current satellite transmissions, L1 would be set for C/A code or P(Y) code, L2 would be set for P(Y) code and L3 would be set for C/A code.

The CODE MIXER 1 performs the code correlation at 3 time points (E-early, P-punctual and L-late) on the autocorrelation function graph. The output of the CODE MIXER 1 block has carrier and code stripped but still contains data modulation (50 Baud in case of L1). The signals $I_E$, $I_P$ and $I_L$, (340) and $Q_E$, $Q_P$ and $Q_L$ (342) are accumulated in the block CORRELATORs 1 (320) over a period equal to an integer number of Epoch 1 signal (328). These accumulated signals $\Sigma I_E$, $\Sigma I_P$, $\Sigma I_L$, $\Sigma Q_E$, $\Sigma Q_P$ and $\Sigma Q_L$, are read by the MICROPROCESSOR SYSTEM (144), which then uses these accumulations to form code and carrier tracking loop errors and perform data demodulations. The Epoch is a standard signal derived and in synchronism with the C/A code in the CODE GENERATOR 1 block 324. It clocks at a 1 kHz rate. The CODE GENERATOR 1 (324) is the standard shift register sequences described in the "ICD-GPS-200".

FIGS. 20a and 20b show flow diagrams of typical L1 (350) and L2 (370) acquisition modes. The main differences between the L1 and L2 acquisition modes is that L2 waits until L1 is locked before proceeding with its own search, and L2 uses code phase and carrier frequency information from L1 tracking to aid in its search. When L1's code tracking loop is locked, L2 can use the L1 tracking code phase to initialize its own code phase. The difference between L1 and L2 code phase is due to ionospheric delay difference (proportional to inverse of transmit carrier frequency squared) and receiver group delay differences between the L1 and L2 signal paths. These delays are significantly less (<100 nanoseconds) than a full code search (1 millisecond for C/A, a week for P(Y)). When L1's carrier tracking loop is locked, L2 can compute an accurate estimate of L2 carrier frequency offset from nominal (due to Doppler and receiver clock offset) from:

$$L2 \text{ frequency} = (120/154) * L1 \text{ frequency.} \qquad (1)$$

The relationship (1) is true because all clocks are locked in frequency on the satellite and hence an exact ratio, 120/154, exists to convert L1 frequency to L2 frequency.

Both L1 (358) and L2 (380) flow charts contain a "Power found in correlator summations" function. This function is performed by comparing any of the following correlator equations with a threshold i.e. if power is greater than the threshold power has been found:

$$[(\Sigma I_E)^2 + (\Sigma Q_E)^2]^{1/2} > \text{threshold} \Rightarrow \text{power found;} \qquad (2)$$

$$[(\Sigma I_P)^2 + (\Sigma Q_P)^2]^{1/2} > \text{threshold} \Rightarrow \text{power found;} \qquad (3)$$

$$[(\Sigma I_L)^2 + (\Sigma Q_L)^2]^{1/2} > \text{threshold} \Rightarrow \text{power found.} \qquad (4)$$

The L3 acquisition mode (390) can be similar to the L2 acquisition mode as depicted in FIG. 20c. In the L3 case, the carrier frequency computation involves multiplying the L1 frequency offset by 135/154, reflecting the ratio of the L3 to the L1 carrier frequency. Essentially, any signal frequency which is being tracked can aid the acquisition of one or both of the other signal frequencies.

FIG. 21 shows a typical L1 tracking mode sequence (410). This mode is substantially similar for L1, L2 and L3 tracking with some subtle but important differences in the L3 case.

The CORRELATOR block is read at regular intervals by the MICROPROCESSOR system (412). For L1 and L2 tracking the interval can be anywhere from 1 to 20 milliseconds. At least 1 millisecond ensures correlation across a full C/A code period. The limit of 20 milliseconds is due to the 50 Baud data modulation present on L1 and L2 signals. It is possible to integrate across a single data bit, improving signal-to-noise ratio (SNR), but integrating across consecutive data bits may cause a data bit to nullify the next data bit i.e. data bits have different sign. Increasing the integration period is desirable to increase SNR and reduce the computation requirements of the MICROPROCESSOR system. For L3 this integration period must be 1 millisecond as the data modulation alters the signal every millisecond. Further integration in the MICROPROCESSOR system is possible if the information about the intended sign and magnitude of the $\Sigma I_P$ correlator is available. This process is called data stripping.

The "Still locked?" (414) function can be implemented by comparing the relative magnitudes of the $\Sigma I_P$ and $\Sigma I_Q$ correlators. For instance, if:

$$(\Sigma I_P > 2^* \Sigma I_Q); \qquad (5)$$

then "Still locked?" function is realized.

The code tracking loop function (418) is typically realized using a combination of the Early and Late correlators. For instance:

$$\text{Code\_Tracking\_Loop\_Error} = [\Sigma I_E - \Sigma I_L]/K_{code\_loop}; \qquad (6)$$

wherein $K_{code\_loop}$ is the loop gain constant. The code tracking loop error is then lowpass filtered before a code phase correction is made to the CODE NCO block.

As was explained above, in the L3 case each of the millisecond correlation's can assume one of 12 different amplitude/phase states. To accommodate for this the receiver must keep track of the maximum $\Sigma I_P$ amplitude and scale each subsequent code tracking loop error as follows:

$$\text{Code\_Tracking\_Loop\_Error} = (\Sigma I_{P\_MAX}/\Sigma I_{P\_CURRENT})^*[\Sigma I_E - \Sigma I_L]/K_{code\_loop}. \qquad (7)$$

The carrier tracking loop function (420) is typically realized using a combination of I and Q Punctual correlators. For instance:

$$\text{Carrier\_Tracking\_Loop\_Error} = \tan^{-1}[\Sigma Q_P/\Sigma I_P]. \qquad (8)$$

The carrier tracking loop error is lowpass filtered before a carrier frequency correction is made to the CARRIER NCO block. The carrier tracking loop error function given above is amplitude self scaled in the presence of the L3 data modulation and will operate successfully with L1, L2 and L3 tracking.

The L1 and L2 data demodulation (422) involves integrating the $\Sigma I_P$ across the 20 millisecond (50 Baud) data period and then making a determination as to whether a "1" (positive integration) or "0" (negative integration) is present. For L3 each one millisecond correlation indicates a sign of integration bit as well as an amplitude. For instance:

$$\text{data\_bit\_amplitude} = 6^*(\Sigma I_{P\_CURRENT}/\Sigma I_{P\_MAX}). \qquad (9)$$

It follows, that if $(\Sigma I_{P\_CURRENT}/\Sigma I_{P\_MAX}) = 5/6$, then data_bit_amplitude=5. The amplitude and sign combined give a range of data values:

$$-6, -5, \ldots, -1, 1, \ldots, 5, 6; \qquad (10)$$

for each millisecond correlation.

Code and carrier phase measurements can be performed in an identical manner for L1, L2 and L3. The code phase measurement (426) is made by tracking the code phase updates that have been made to the CODE NCO by the MICROPROCESSOR system. This value is then lowpass filtered by the MICROPROCESSOR SYSTEM before passing the measurement to the NAVIGATION PROCESSOR.

The carrier phase measurement (424) is made by latching and reading the CARRIER NCO state on the MSEC signal. This value is also lowpass filtered by the MICROPROCESSOR SYSTEM before passing the measurement to the NAVIGATION PROCESSOR.

After the measurement is performed, the data is post-processed. Typically, L1 and L2 code and carrier measurement processing receivers allow faster and more reliable carrier cycle ambiguity resolution. These receivers also allow the resolution of the carrier cycle ambiguities over long baselines (>10 km). See "Ambiguity Recovery for GPS Long Range Kinematic Positioning", S. Han, Proceedings of ION GPS-95. The addition of the L3 code and carrier phase measurements to this post-processing technique significantly enhances the speed, robustness and reliability of carrier cycle ambiguity resolution. Table 2 shows some of the possible useful phase combinations involving L1, L2 and L3.

TABLE 2

| Signal Combination | Wavelength of Combination (cms) |
| --- | --- |
| L1 only | 19 |
| L2 only | 24.4 |
| L3 only | 21.7 |
| L1 and L2 widelane | 86.3 |
| L1 and L3 widelane | 154.3 |
| L3 and L2 widelane | 195.5 |
| L1, L2 and L3 extra widelane | 733.1 |

FIGS. 22 and 23 show zero baseline double difference code and carrier phase measurements performed using the L3 signal. The zero baseline double difference is a standard method for determining measurement quality, wherein measurements from two receivers attached to a single antenna and receiving two satellites are involved. These measurements show that the L3 signal is capable of providing quality code and carrier phase measurements.

The carrier phase measurement combination shown in table 2 indicate that useful widelane combinations exist between any two of the three frequencies. If any frequency is unavailable due to signal jamming a useful widelane or ionospherically corrected measurement can still be formed. All three frequencies can be combined to form an extra widelane (difference of (L1 -L3) and (L3 -L2)) measurement. When all signals are available each widelane pair may be cross checked against widelanes formed with the other frequency. It is clear that these and many other useful measurement combinations are possible to improve robustness, reliability and time to solution in GPS applications.

The carrier phase cycle slip detection and fix algorithms will also benefit substantially from the use of the L3 signal, with the three signals being cross-checked to detect if one signal has cycle slipped. The undetected cycle slip can cause the wrong answer to be obtained without the receiver knowing it.

Any two signal frequencies can also be used to select the correct carrier cycle from a third frequency by narrowing down the possible candidates i.e. by ignoring candidates that do not line up in phase with the other two frequencies.

FIG. 24 depicts transmission times over 24 hour period (L3 signal is under L1 signal for each satellite). Satellite numbers are given on the Y-axis. Each satellite is represented by two lines. When lines are present the satellites are transmitting. This graph shows that L3 is not on continuously, but goes on and off according to the non-navigational operational requirements of the signal. It is possible that the L3 signal will be extensively used in the future and thus be more available for use in navigation receivers. It is also possible that the C/A code observed on L3 will be replaced by the P(Y) code for more secure transmissions. If this is the case, the implementation of codeless or semi-codeless techniques will allow continued civilian use of the L3 signal in conjunction with the receiver techniques revealed in this patent application.

The L1 and L3 signals can provide an estimate of the ionospheric delay and delay rate to initialize the search for the L2 in codeless and semi-codeless schemes. The combination of L1 and L2 is currently used for measurement of the ionospheric delay. Indeed, as the signal traverses the atmosphere, the ionospheric delay is inversely proportional to the square of the difference between the two frequencies:

$$\text{Ionospheric\_delay} = K/(\Delta f)^2; \tag{11}$$

wherein K is a constant.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. A system for optimum correlation processing of at least three signals M1, M2, and M3 emanating from the same satellite belonging to the satellite positioning system (SPS), said system comprising:
   a RECEIVING CIRCUIT for receiving and preparing for processing each said M1, M2, and M3 signal; and
   a DIGITAL SIGNAL PROCESSING CIRCUIT for processing each said M1, M2, and M3 signal in order to perform the code and carrier measurements to solve for user's position, velocity, and time coordinate;
   wherein the availability of at least three M1, M2, and M3 signals increases the accuracy in finding the user's position, velocity, and time coordinate.

2. A system for optimum correlation processing of at least three L1, L2, and L3 signals received from a SPS satellite by a SPS RECEIVER, said system comprising:
   a RECEIVING CIRCUIT for receiving a known C/A code and a known P(Y) code modulated on L1 carrier frequency signal, for receiving a known P(Y) code modulated on L2 carrier frequency signal, and for receiving a known C/A code modulated on L3 carrier frequency from at least one satellite; wherein said received L1, L2, and L3 signals contain propagation noise; and
   at least one DIGITAL CHANNEL PROCESSING CIRCUIT for:
   (1) locally generating replica of said C/A code modulated on L1 carrier frequency signal and on L3 carrier frequency;
   (2) locally generating replica of said P(Y) code modulated on L1 carrier frequency signal and on L2 carrier frequency signal;
   (3) correlating a locally generated replica of C/A or P(Y) code with the received L1 code for obtaining an estimate of L1 group delay (L1 pseudo-range) and L1 carrier phase;
   (4) correlating a locally generated replica of P(Y) code with the received L2 code for obtaining an estimate of L2 group delay (L2 pseudo-range) and L2 carrier phase; and
   (5) correlating a locally generated replica of C/A code with the received L3 code for obtaining an estimate of L3 group delay (L3 pseudo-range) and L3 carrier phase.

3. The system of claim 2, wherein said RECEIVING CIRCUIT further comprises:
   a triple frequency patch ANTENNA CIRCUIT for receiving said L1, L2, and L3 satellite signals;
   a FILTER /LNA CIRCUIT conductively connected to said ANTENNA CIRCUIT for performing filtering and low noise amplification of said L1, L2, and L3 signals, wherein said FILTER/LNA determines the signal/noise ratio of the received signals L1, L2, and L3;
   a DOWNCONVERTER CIRCUIT conductively connected to said FILTER/LNA CIRCUIT for mixing and converting said L1, L2, and L3 signals; and
   an IF PROCESSOR CIRCUIT conductively connected to said DOWNCONVERTER CIRCUIT for transforming said converted L1, L2, and L3 signals into digitally sampled quadrature versions of L1, L2, and L3 signals (IL1, QL1, IL2, QL2, IL3, QL3).

4. The system of claim 3 further comprising a MASTER OSCILLATOR CIRCUIT and a FREQUENCY SYNTHESIZER CIRCUIT conductively connected to said MASTER OSCILLATOR CIRCUIT, to said IF PROCESSOR CIRCUIT, to said DOWNCONVERTER CIRCUIT, and to at least one said DIGITAL CHANNEL PROCESSING CIRCUIT, wherein said FREQUENCY SYNTHESIZER CIRCUIT generates several timing signals.

5. The system of claim 3, wherein said FILTER /LNA CIRCUIT further comprises:
   a POWERSPL1TTER CIRCUIT connected to said ANTENNA CIRCUIT for power splitting a single L1/L2/L3 signal received by said ANTENNA CIRCUIT into three separate L1, L2, and L3 signals;
   three separate BANDPASS FILTER CIRCUIT connected to said POWERSPL1TTER CIRCUIT for filtering said L1, L2, and L3 signals independently; and
   a POWER COMBINER CIRCUIT connected to each said BANDPASS FILTER CIRCUIT for power combining said L1, L2, and L3 signals into one combined signal L1/L2/L3 before feeding said combined L1/L2/L3 signal into said LNA CIRCUIT;
   wherein said LNA outputs amplified and filtered combined Ll/L2/L3 signal.

6. The system of claim 4, wherein said FREQUENCY SYNTHESIZER CIRCUIT further comprises:
   a first DIVIDER CIRCUIT connected to said MASTER OSCILLATOR CIRCUIT to divide said MASTER OSCILLATOR output signal to obtain an input signal;
   a PHASE DETECTOR CIRCUIT for comparing phases of two signals, said first signal being said input signal, said second signal being a local reference signal, wherein minimum voltage output signal from said PHASE DETECTOR CIRCUIT represents maximum phase alignment of said two signals;
   a LOOP FILTER CIRCUIT connected to said PHASE DETECTOR CIRCUIT for filtering out high frequency voltage noise, wherein an output LOOP FILTER CIRCUIT voltage signal includes a low frequency voltage noise;
   a VOLTAGE CONTROLLED OSCILLATOR (VCO) CIRCUIT connected to said LOOP FILTER CIRCUIT, wherein a voltage signal at the input of said VCO causes frequency change in said VCO output signal, and wherein said VCO nominal output signal is locked to said reference signal; and wherein said VCO nominal output signal is used as 1st local oscillator (LO1) signal;

a second DIVIDER CIRCUIT connected to said VCO to divide said VCO output signal to obtain 2nd local oscillator (LO2) signal;

a third DIVIDER CIRCUIT connected to said second DIVIDER CIRCUIT to divide said 2nd LO2 signal to obtain sampling clock (SCLK) signal;

a fourth DIVIDER CIRCUIT connected to said third DIVIDER CIRCUIT to divide said 2nd LO2 signal to obtain a signal MSEC, wherein said signal MSEC is used for measurement of local reference time;

a MULTIPLIER CIRCUIT connected to said MASTER OSCILLATOR CIRCUIT for multiplying the MASTER OSCILLATOR output signal to obtain a 4th local oscillator clock signal LO4; and a fifth DIVIDER CIRCUIT connected to said fourth DIVIDER CIRCUIT to divide said SCLK signal to obtain a reference signal, wherein said reference signal is used by said PHASE DETECTOR CIRCUIT.

7. The system of claim 4, wherein said FREQUENCY SYNTHESIZER CIRCUIT further comprises:

a "Divide by 5" block;

a PHASE DETECTOR CIRCUIT connected to said block "Divide by 5" for comparing 5 MHz input signal from said MASTER OSCILLATOR CIRCUIT with 5 MHz signal from said "Divide by 5" block, wherein minimum voltage output signal from said PHASE DETECTOR CIRCUIT represents maximum phase alignment of two said 5 MHz signals;

a LOOP FILTER CIRCUIT connected to said PHASE DETECTOR CIRCUIT for filtering out high frequency voltage noise;

a VOLTAGE CONTROLLED OSCILLATOR (VCO) CIRCUIT connected to said LOOP FILTER CIRCUIT, wherein voltage signal at the input of said VCO causes frequency change in said VCO output signal, and wherein said VCO nominal output 1400 MHz signal is locked to said 5 MHz reference signal; and wherein said 1400 MHz VCO output signal is used as a 1st local oscillator (LO1);

a "Divide by 8" block connected to said VCO to divide said 1400 MHz VCO output signal by 8 to obtain a 175 MHz signal used as a 2nd LO2;

a "Divide by 7" block connected to said "Divide by 8" block to divide said 175 MHz signal by 7 to obtain a 25 MHz signal used as a sampling clock (SCLK);

a "Divide by 25000" block connected to said "Divide by 7" block to divide said 25 MHz signal by 25000 to obtain a 1 KHz signal (MSEC), wherein said MSEC signal is used for measurement of local reference time; and a "Multiply by 2" block connected to said MASTER OSCILLATOR block to obtain a 20 MHz signal used as a fourth clocking signal LO4.

8. The system of claim 3, wherein said DOWNCONVERTER CIRCUIT further comprises:

a POWERSPLITTER CIRCUIT connected to said FILTER /LNA CIRCUIT and to said FREQUENCY SYNTHESIZER for power splitting said FILTER/LNA CIRCUIT output L1/L2/L3 signal into three signals;

a first MULTIPLIER CIRCUIT connected to said POWERSPLITTER CIRCUIT for multiplying said L1 signal with said 1st LO1 signal, wherein a first mixed signal is produced;

a second MULTIPLIER CIRCUIT connected to said POWERSPLITTER CIRCUIT for multiplying said L2 signal with said 1st LO1 signal, wherein a second mixed signal is produced;

a third MULTIPLIER CIRCUIT connected to said POWERSPLITTER CIRCUIT for multiplying said L3 signal with said 1st LO1 signal, wherein a third mixed signal is produced;

a first BANDPASS FILTER CIRCUIT connected to said first MULTIPLIER CIRCUIT for filtering said first mixed signal;

a second BANDPASS FILTER CIRCUIT connected to said second MULTIPLIER CIRCUIT for filtering said second mixed signal;

a third BANDPASS FILTER CIRCUIT connected to said third MULTIPLIER CIRCUIT for filtering said third mixed signal;

a first AMPLIFIER CIRCUIT connected to said first BANDPASS FILTER CIRCUIT for amplifying said first filtered signal;

a second AMPLIFIER CIRCUIT connected to said second BANDPASS FILTER CIRCUIT for amplifying said second filtered signal; and a third AMPLIFIER CIRCUIT connected to said third BANDPASS FILTER CIRCUIT for amplifying said third filtered signal.

9. The system of claim 3, wherein said IF PROCESSOR CIRCUIT further comprises:

a first POWERSPLITTER CIRCUIT connected to said DOWNCONVERTER CIRCUIT and to said FREQUENCY SYNTHESIZER CIRCUIT for power splitting said L1 signal into two signals;

a second POWERSPLITTER CIRCUIT connected to said DOWNCONVERTER CIRCUIT and to said FREQUENCY SYNTHESIZER CIRCUIT for power splitting said L2 signal into two signals;

a third POWERSPLITTER CIRCUIT connected to said DOWNCONVERTER CIRCUIT and to said FREQUENCY SYNTHESIZER CIRCUIT for power splitting said L3 signal into two signals;

a first MULTIPLIER CIRCUIT for multiplying said L1 signal with an inphase (I) version of said 2nd LO2 signal to produce an IL1 signal;

a second MULTIPLIER CIRCUIT for multiplying said L1 signal with a quadrature (Q) version of said 2nd LO2 signal to produce a QL1 signal;

a third MULTIPLIER CIRCUIT for multiplying said L2 signal with an inphase (I) version of said 2nd LO2 signal to produce an IL2 signal;

a fourth MULTIPLIER CIRCUIT for multiplying said L2 signal with a quadrature (Q) version of said 2nd LO2 signal to produce a QL2 signal;

a fifth MULTIPLIER CIRCUIT for multiplying said L3 signal with an inphase (I) version of said 4th LO4 signal to produce an IL3 signal;

a sixth MULTIPLIER CIRCUIT for multiplying said L3 signal with a quadrature (Q) version of said 4th LO4 signal to produce a QL3 signal;

a first AMPLIFIER CIRCUIT connected to said first MULTIPLIER CIRCUIT for amplifying said IL1 signal;

a second AMPLIFIER CIRCUIT connected to said second MULTIPLIER CIRCUIT for amplifying said QL1 signal;

a third AMPLIFIER CIRCUIT connected to said third MULTIPLIER CIRCUIT for amplifying said IL2 signal;

a fourth AMPLIFIER CIRCUIT connected to said fourth MULTIPLIER CIRCUIT for amplifying said QL2 signal;

a fifth AMPLIFIER CIRCUIT connected to said fifth MULTIPLIER CIRCUIT for amplifying said IL3 signal;

a sixth AMPLIFIER CIRCUIT connected to said sixth MULTIPLIER CIRCUIT for amplifying said QL3 signal;

a first one-bit analog-to-digital (A/D) CONVERTER CIRCUIT connected to said first AMPLIFIER CIRCUIT for performing 1-bit quantization operation on said IL1 signal;

a second one-bit analog-to-digital (A/D) CONVERTER CIRCUIT connected to said second AMPLIFIER CIRCUIT for performing 1-bit quantization operation on said QL1 signal; a third one-bit analog-to-digital (A/D) CONVERTER CIRCUIT connected to said third AMPLIFIER CIRCUIT for performing 1-bit quantization operation on said IL2 signal;

a fourth one-bit analog-to-digital (A/D) CONVERTER CIRCUIT connected to said fourth AMPLIFIER CIRCUIT for performing 1-bit quantization operation on said QL2 signal;

a fifth one-bit analog-to-digital (A/D) CONVERTER CIRCUIT connected to said fifth AMPLIFIER CIRCUIT for performing 1-bit quantization operation on said IL3 signal;

a sixth one-bit analog-to-digital (A/D) CONVERTER CIRCUIT connected to said sixth AMPLIFIER CIRCUIT for performing 1-bit quantization operation on said QL3 signal;

a first FLIP-FLOP CIRCUIT (FF1) connected to said first one-bit A/D CONVERTER for sampling said IL1 signal, wherein said sampling operation is performed by clocking said IL1 signal through said FF1 at sampling clock (SCLK) rate;

a second FLIP-FLOP CIRCUIT (FF2) connected to said second one-bit A/D CONVERTER for sampling said QL1 signal, wherein said sampling operation is performed by clocking said QL1 signal through said FF2 at sampling clock (SCLK) rate;

a third FLIP-FLOP CIRCUIT (FF3) connected to said third one-bit A/D CONVERTER for sampling said IL2 signal, wherein said sampling operation is performed by clocking said IL2 signal through said FF3 at sampling clock (SCLK) rate;

a fourth FLIP-FLOP CIRCUIT (FF4) connected to said fourth one-bit A/D CONVERTER for sampling said QL2 signal, wherein said sampling operation is performed by clocking said QL2 signal through said FF4 at sampling clock (SCLK) rate;

a fifth FLIP-FLOP CIRCUIT (FF5) connected to said fifth one-bit A/D CONVERTER for sampling said IL3 signal, wherein said sampling operation is performed by clocking said IL3 signal through said FF5 at sampling clock (SCLK) rate; and a sixth FLIP-FLOP CIRCUIT (FF6) connected to said sixth one-bit A/D CONVERTER for sampling said QL3 signal, wherein said sampling operation is performed by clocking said QL3 signal through said FF6 at sampling clock (SCLK) rate.

10. The system of claim 2, wherein each said DIGITAL CHANNEL PROCESSING CIRCUIT further comprises:

an L1 TRACKER CIRCUIT for locally generating replica of said C/A code and said P(Y) code modulated on L1 carrier frequency signal, for tracking an L1 satellite signal, and for correlating said locally generated replica of C/A and P(Y) code with the received L1 code for obtaining an estimate of L1 group delay (L1 pseudo-range) and L1 carrier phase;

an L2 TRACKER CIRCUIT connected to said L1 TRACKER CIRCUIT for locally generating replica of said P(Y) code modulated on L2 carrier frequency signal, for tracking an L2 satellite signal, and for correlating said locally generated replica of P(Y) code with the received L2 code for obtaining an estimate of L2 group delay (L2 pseudo-range) and L2 carrier phase;

an L3 TRACKER CIRCUIT connected to said L2 TRACKER CIRCUIT for locally generating replica of said C/A code modulated on L3 carrier frequency signal, for tracking an L3 satellite signal, and for correlating said locally generated replica of C/A code with the received L3 code for obtaining an estimate of L3 group delay (L3 pseudo-range) and L3 carrier phase; and a MICROPROCESSOR CIRCUIT system connected to said L1 TRACKER CIRCUIT, to said L2 TRACKER CIRCUIT, and to said L3 TRACKER CIRCUIT;

wherein said L1 TRACKER CIRCUIT is fed by digitized inphase IL1 and quadrature QL1 of L1 signal outputted by said IF PROCESSOR CIRCUIT; and wherein said L2 TRACKER CIRCUIT is fed by digitized inphase IL2 and quadrature QL2 of L2 signal outputted by said IF PROCESSOR CIRCUIT; and wherein said L3 TRACKER CIRCUIT is fed by digitized inphase IL3 and quadrature QL3 of L3 signal outputted by said IF PROCESSOR CIRCUIT; and wherein each said L1, L2, and L3 TRACKER CIRCUIT are synchronously clocked by said SCLK signal and synchronously referenced by said MSEC signal to local reference time; said SCLK and MSEC signals being outputted by said FREQUENCY SYNTHESIZER CIRCUIT; and wherein said MICROPROCESSOR CIRCUIT system is fed by output signals from said L1 TRACKER CIRCUIT, from said L2 TRACKER CIRCUIT, and from said L3 TRACKER CIRCUIT; and wherein said L1 TRACKER CIRCUIT, said L2 TRACKER CIRCUIT, and said L3 TRACKER CIRCUIT are fed by CONTROL signal generated by said MICROPROCESSOR CIRCUIT.

11. The system of claim 10, wherein said L1 TRACKER CIRCUIT further comprises:

a CODE GENERATOR CIRCUIT 1 for providing a locally generated replica of C/A code and P(Y) code;

a MULTIPLEXER CIRCUIT 1 connected to said CODE GENERATOR CIRCUIT 1 for selecting a locally generated code C/A or a locally generated P(Y), wherein said MULTIPLEXER CIRCUIT 1 is controlled by CONTROL signal generated by said MICROPROCESSOR SYSTEM;

a carrier numerically controlled oscillator (CARRIER NCO CIRCUIT 1) connected to said MULTIPLEXER CIRCUIT 1;

a COMPLEX MIXER CIRCUIT 1 connected to said CARRIER NCO CIRCUIT 1 for multiplying outputted by said IF PROCESSOR CIRCUIT digitized inphase IL1 and QL1 signals having carrier frequency with outputted by said CARRIER NCO CIRCUIT 1 inphase and quadrature components of digital carrier; wherein said CARRIER MIXER CIRCUIT 1 outputs inphase IL1 and quadrature QL1 signals having zero carrier frequency;

a CODE MIXER CIRCUIT 1 connected to said COMPLEX MIXER CIRCUIT 1, connected to said CODE GENERATOR CIRCUIT 1, and connected to said CARRIER NCO CIRCUIT 1 for code correlating said COMPLEX MIXER CIRCUIT 1 output signals with said locally generated replica of C/A code; wherein when said L1 TRACKER CIRCUIT's carrier tracking loop is closed via said CARRIER NCO CIRCUIT 1 the input to said CODE MIXER CIRCUIT 1 represents the satellite signal L1 C/A code; and wherein said CODE MIXER CIRCUIT 1 performs said code correlation at 3 time points (early, punctual and late) on the autocorrelation function graph creating an early, a punctual and a late sample of the autocorrelation function; a block CORRELATORS CIRCUIT 1 connected to said CODE MIXER CIRCUIT 1 for integrating said early, punctual and late samples of said autocorrelation function; wherein said CORRELATORS CIRCUIT 1 output signal is fed to said MICROPROCESSOR CIRCUIT system at a rate of L1 C/A code epoch, and wherein said MICROPROCESSOR CIRCUIT uses said CORRELATORS CIRCUIT 1 output signal to develop feedback signals for the carrier tracking loop and for the code tracking loop; and a code numerically controlled oscillator (CODE NCO CIRCUIT 1) connected to said block CORRELATORS CIRCUIT 1 and connected to said CODE GENERATOR CIRCUIT 1 for providing a clocking signal at C/A code rate and for providing a clocking signal at P code rate, said C/A code clocking rate and said P code clocking rate driving said CODE GENERATOR CIRCUIT 1; said CODE NCO CIRCUIT 1 also providing a mechanism for aligning said locally generated replica of C/A code with said incoming satellite C/A code.

12. A method for optimum correlation processing of at least three signals M1, M2, and M3 emanating from the same satellite belonging to the satellite positioning system (SPS), said method comprising the steps of:

receiving and preparing for processing each said M1, M2, and M3 signal by a RECEIVING CIRCUIT; and processing each said M1, M2, and M3 signal in order to perform the code and carrier measurements to solve for user's position, velocity, and time coordinate by a DIGITAL SIGNAL PROCESSING CIRCUIT;

wherein the availability of at least three M1, M2, and M3 signals increases the accuracy in finding the user's position, velocity, and time coordinate.

13. A method for optimum correlation processing of at least three L1, L2, and L3 signals received from a SPS satellite by a SPS RECEIVER, said method comprising the steps of:

receiving a known C/A code and a known P(Y) code modulated on L1 carrier frequency signal from at least one satellite by a RECEIVING CIRCUIT;

receiving a known P(Y) code modulated on L2 carrier frequency signal from at least one satellite by a RECEIVING CIRCUIT;

receiving a known C/A code modulated on L3 carrier frequency from at least one satellite by a RECEIVING CIRCUIT;

locally generating replica of said C/A code modulated on L1 carrier frequency by at least one DIGITAL CHANNEL PROCESSING CIRCUIT;

locally generating replica of said C/A code modulated on L3 carrier frequency by at least one DIGITAL CHANNEL PROCESSING CIRCUIT;

locally generating replica of said P(Y) code modulated on L1 carrier frequency by at least one DIGITAL CHANNEL PROCESSING CIRCUIT;

locally generating replica of said P(Y) code modulated on L2 carrier frequency by at least one DIGITAL CHANNEL PROCESSING CIRCUIT;

correlating the locally generated replica of C/A code with the received L1 code for obtaining an estimate of L1 group delay (L1 pseudo-range) and L1 carrier phase by at least one DIGITAL CHANNEL PROCESSING CIRCUIT;

correlating the locally generated replica of P(Y) code with the received L1 code for obtaining an estimate of L1 group delay (L1 pseudo-range) and L1 carrier phase by at least one DIGITAL CHANNEL PROCESSING CIRCUIT;

correlating the locally generated replica of P(Y) code with the received L2 code for obtaining an estimate of L2 group delay (L2 pseudo-range) and L2 carrier phase by at least one DIGITAL CHANNEL PROCESSING CIRCUIT; and correlating the locally generated replica of C/A code with the received L3 code for obtaining an estimate of L3 group delay (L3 pseudo-range) and L3 carrier phase by at least one DIGITAL CHANNEL PROCESSING CIRCUIT.

* * * * *